(12) United States Patent
Kray et al.

(10) Patent No.: US 11,834,965 B2
(45) Date of Patent: Dec. 5, 2023

(54) BLADE DOVETAIL AND RETENTION APPARATUS

(71) Applicant: General Electric Company, Schenectady, NY (US)

(72) Inventors: Nicholas Joseph Kray, West Chester, OH (US); Ian F. Prentice, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/410,754

(22) Filed: Aug. 24, 2021

(65) Prior Publication Data

US 2022/0098991 A1    Mar. 31, 2022

Related U.S. Application Data

(60) Provisional application No. 63/070,259, filed on Aug. 25, 2020.

(51) Int. Cl.
*F01D 7/00* (2006.01)
*F01D 5/30* (2006.01)
(Continued)

(52) U.S. Cl.
CPC ............. *F01D 7/00* (2013.01); *F01D 5/30* (2013.01); *F01D 5/3007* (2013.01); *F01D 5/3015* (2013.01); *F01D 5/3023* (2013.01); *F01D 5/32* (2013.01); *F01D 5/323* (2013.01); *F04D 29/323* (2013.01); *F04D 29/34* (2013.01);
(Continued)

(58) Field of Classification Search
CPC ....... B64C 11/04; B64C 11/06; B64C 11/065; B64C 11/08; B64C 11/10; B64C 11/12; F04D 29/322; F04D 29/323; F04D 29/34; F04D 29/36; F04D 29/362; F04D 29/364; F01D 5/3007; F01D 5/3015; F01D 5/323; F01D 5/30; F01D 5/3069; F01D 5/32; F01D 5/326; F01D 7/00
See application file for complete search history.

(56) References Cited

U.S. PATENT DOCUMENTS 3,986,779 A    10/1976 Beckershoff
4,265,595 A    5/1981 Bucy, Jr. et al.
(Continued)

FOREIGN PATENT DOCUMENTS

CN    104929691 A    9/2015
DE    102007028142 A1    12/2008
(Continued)

OTHER PUBLICATIONS

English machine translation of FR 3035438-A1, Jul. 13, 2022.*
English machine translation of FR 3005683-A1, Jul. 13, 2022.*
English machine translation of 1944472-A1, Mar. 27, 2023.*

*Primary Examiner* — Christopher Verdier
(74) *Attorney, Agent, or Firm* — HANLEY, FLIGHT & ZIMMERMAN, LLC

(57) ABSTRACT

Methods, apparatus, systems, and articles of manufacture are disclosed for a slot to accommodate a blade of an engine. An example blade apparatus includes: a collet including a slot to receive an end of a blade; and a plurality of retainers including a first retainer positioned on a first end of the collet and a second retainer positioned on a second end of the collet to provide axial retention for the blade in the slot.

15 Claims, 29 Drawing Sheets

(51) Int. Cl.
*F01D 5/32* (2006.01)
*F04D 29/32* (2006.01)
*F04D 29/36* (2006.01)
*F04D 29/34* (2006.01)
*B64C 11/34* (2006.01)
*B64C 11/06* (2006.01)

(52) U.S. Cl.
CPC ............ *F04D 29/362* (2013.01); *B64C 11/06* (2013.01); *B64C 11/343* (2013.01); *F05B 2260/74* (2013.01); *F05B 2260/77* (2013.01); *F05D 2220/32* (2013.01); *F05D 2220/323* (2013.01); *F05D 2240/30* (2013.01); *F05D 2260/70* (2013.01); *F05D 2260/74* (2013.01)

(56) References Cited

U.S. PATENT DOCUMENTS

| | | | |
|---|---|---|---|
| 4,711,007 A * | 12/1987 | Conrad | F01D 5/323 |
| | | | 29/525 |
| 4,767,270 A | 8/1988 | Seidel | |
| 5,165,856 A | 11/1992 | Schilling et al. | |
| 5,611,669 A | 3/1997 | Royle | |
| 5,622,476 A | 4/1997 | Adde et al. | |
| 5,749,706 A | 5/1998 | Maar | |
| 6,905,311 B2 | 6/2005 | Leathart | |
| 8,192,167 B2 | 6/2012 | Helmis et al. | |
| 8,439,635 B2 | 5/2013 | Uskert et al. | |
| 9,227,723 B2 | 1/2016 | Balk et al. | |
| 9,739,160 B2 | 8/2017 | Kain et al. | |
| 9,909,431 B2 | 3/2018 | Polyzopoulos et al. | |
| 9,938,000 B2 | 4/2018 | Tajan et al. | |
| 10,215,035 B2 | 2/2019 | Dierksmeier et al. | |
| 10,393,368 B2 | 8/2019 | Smith | |
| 10,415,404 B2 | 9/2019 | Fabre et al. | |
| 2006/0207309 A1 * | 9/2006 | Miosga | F01D 5/30 |
| | | | 72/453.15 |
| 2009/0324414 A1 * | 12/2009 | Helmis | F01D 5/3015 |
| | | | 416/220 R |
| 2012/0020796 A1 * | 1/2012 | Carre | F02K 3/072 |
| | | | 416/219 R |
| 2012/0134829 A1 | 5/2012 | Vance et al. | |
| 2015/0176417 A1 | 6/2015 | Zelmer | |
| 2015/0315934 A1 | 11/2015 | Flock et al. | |

FOREIGN PATENT DOCUMENTS

| | | | | |
|---|---|---|---|---|
| EP | 1944472 A1 * | 7/2008 | ........... | F01D 5/3015 |
| FR | 3005683 A1 * | 11/2014 | ........... | F01D 5/323 |
| FR | 3018868 | 9/2015 | | |
| FR | 3035438 A1 * | 10/2016 | ........... | B64C 11/06 |
| GB | 638856 A * | 6/1950 | ........... | F04D 29/34 |
| GB | 860281 A * | 2/1961 | ........... | F04D 29/34 |
| WO | 20170205246 | 11/2017 | | |

* cited by examiner

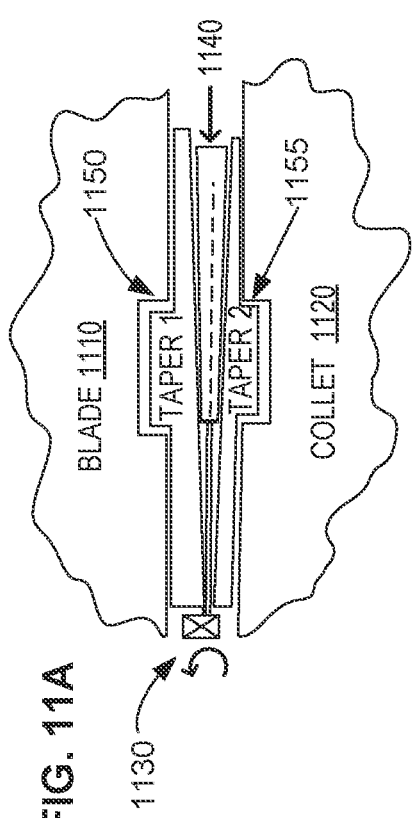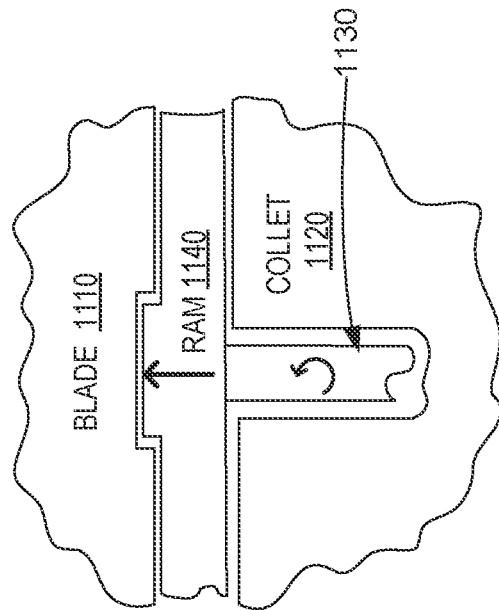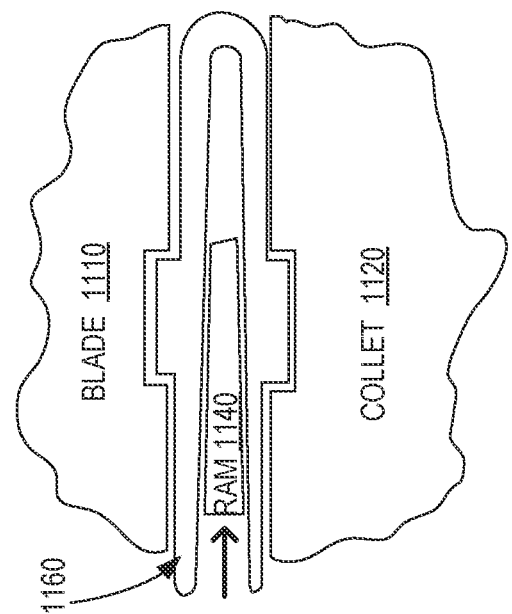
FIG. 11A
FIG. 11B
FIG. 11C

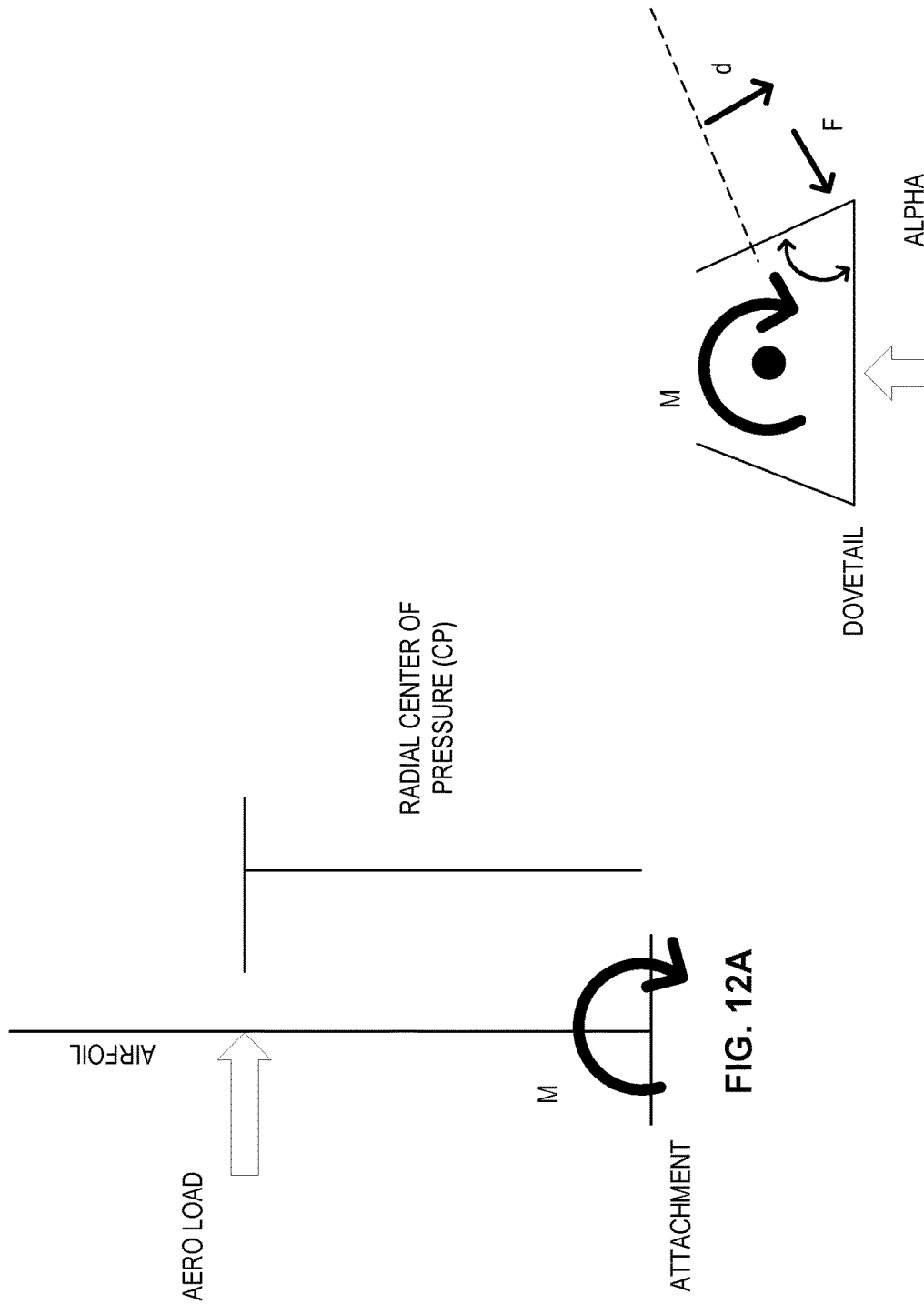

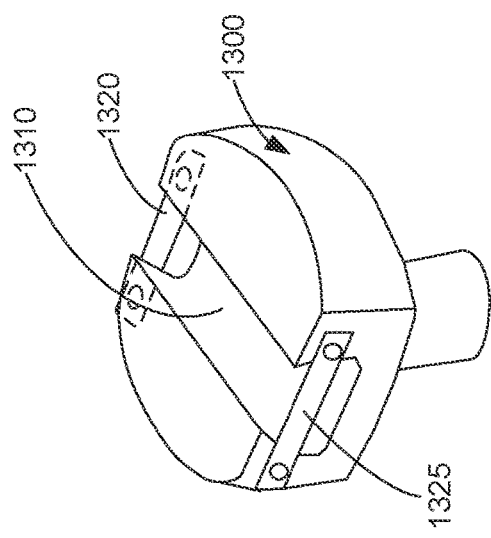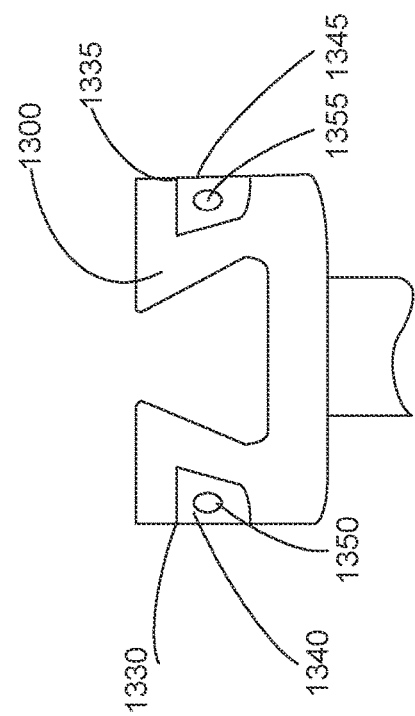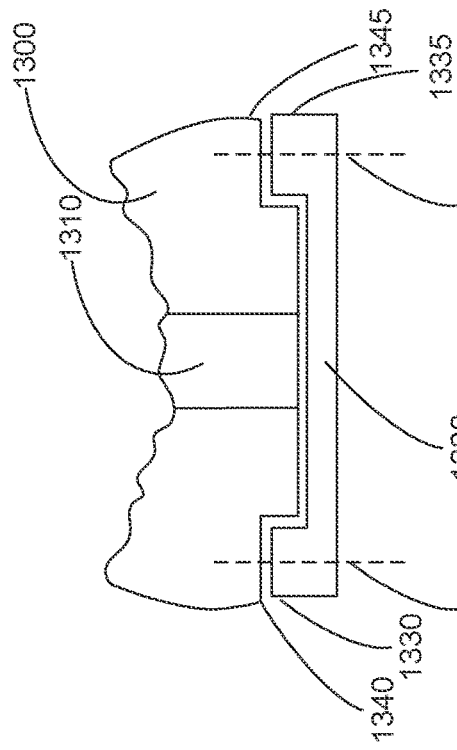

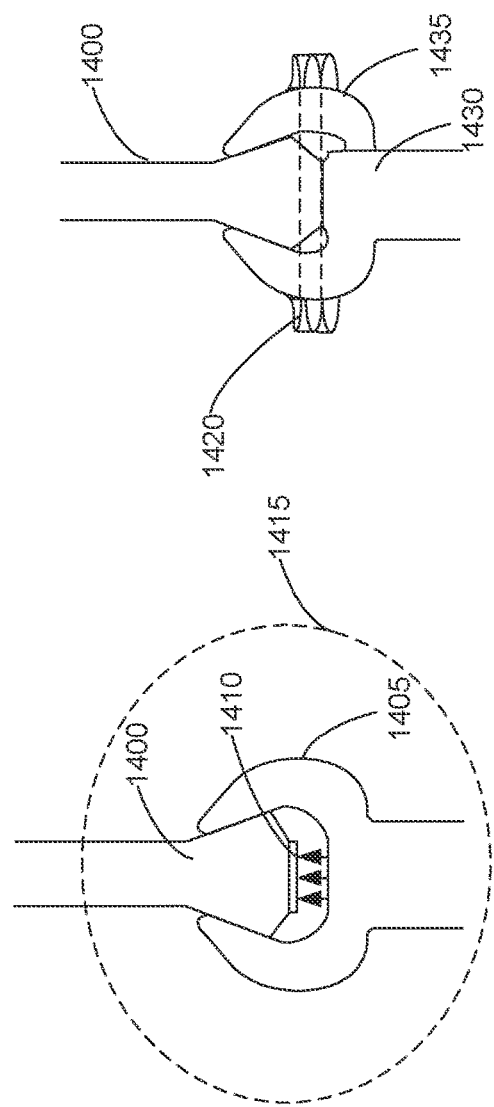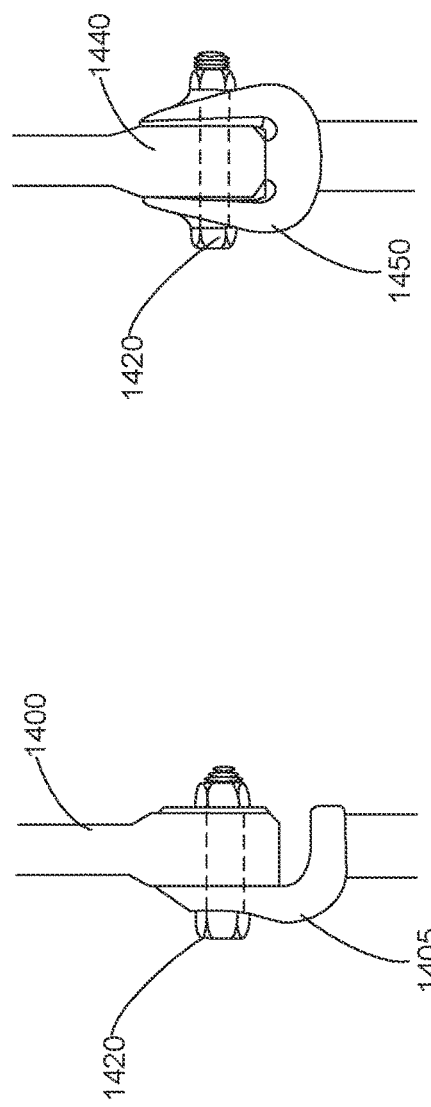

BLADE DOVETAIL AND RETENTION APPARATUS

CROSS-REFERENCE TO RELATED APPLICATIONS

This patent arises from U.S. Provisional Patent Application Ser. No. 63/070,259, which was filed on Aug. 25, 2020. U.S. Provisional Patent Application Ser. No. 63/070,259 is hereby incorporated herein by reference in its entirety. Priority to U.S. Provisional Patent Application Ser. No. 63/070,259 is hereby claimed.

FIELD OF THE DISCLOSURE

This disclosure relates generally to blade retention, and more particularly, to a retention apparatus for a blade dovetail.

BACKGROUND

In recent years, turbine engines have been increasingly utilized in a variety of applications and fields. Turbine engines are intricate machines with extensive availability, reliability, and serviceability requirements. Turbine engines include fan blades. The fan blades spin at high speed and subsequently compress the air flow. The high-pressure compressor then feeds the pressurized air flow to a combustion chamber to generate a high-temperature, high-pressure gas stream. In operation, various forces act on the blades and can cause the blades to become unseated and/or otherwise unsuitable for continued operation in the engine.

BRIEF DESCRIPTION OF THE DRAWINGS

FIGS. 11A-11C illustrate example blade dovetail axial and radial retention configurations.

FIGS. 12A-12B illustrate an example parameterization with respect to ram loads.

FIGS. 13A-13C illustrate an improved collet dovetail configuration in which a blade dovetail slot is provided in a collet and/or trunnion with combined axial retention and slot stiffeners on both sides of the slot.

FIGS. 14A-14D show alternative example views of a collet and dovetail design, in which the dovetail surrounds and/or is otherwise attached to the collet, rather than being positioned in a slot.

Figure 1A:
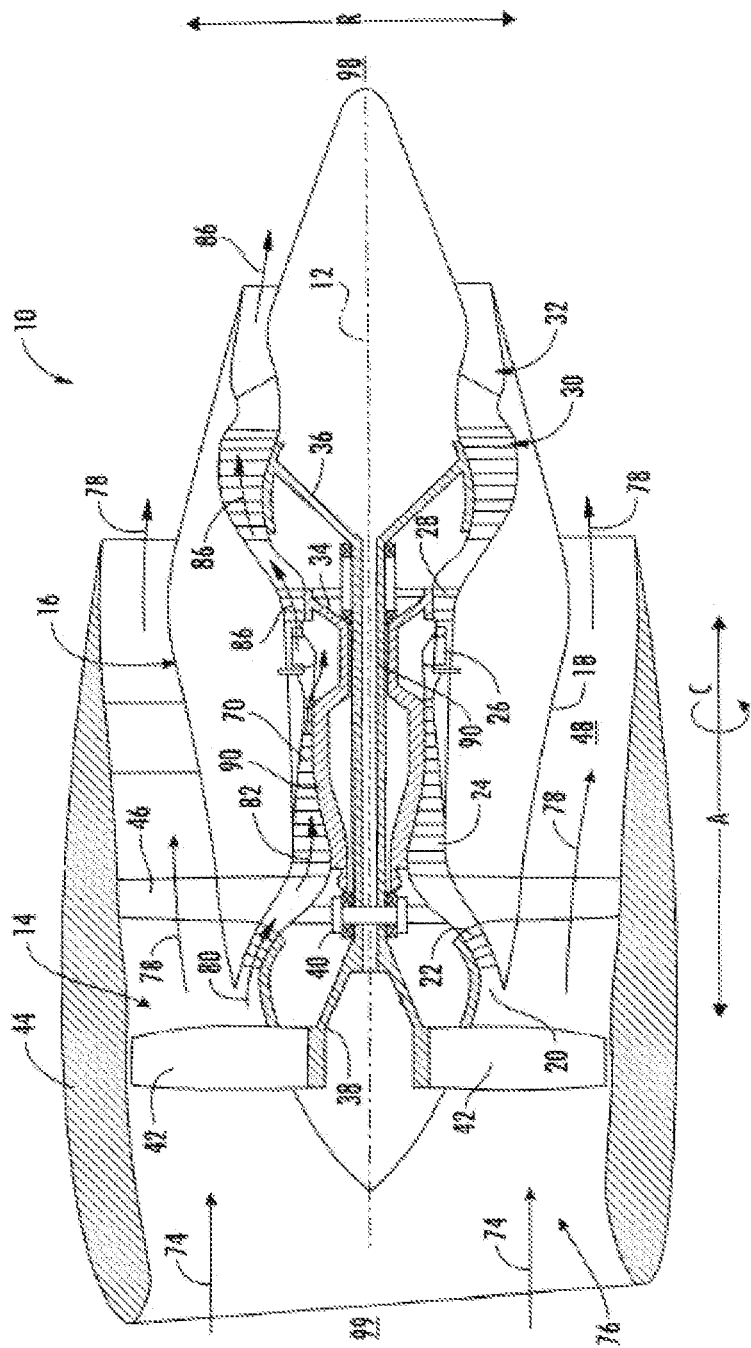
FIG. 1A illustrates an example cross-section view of an example turbofan gas turbine engine.

The figures are not to scale. Instead, the thickness of regions may be enlarged in the drawings. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" and/or "direct contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Aircrafts include engines that act as a propulsion system to generate mechanical power and forces such as thrust. A gas turbine, also called a combustion turbine or a turbine engine, is a type of internal combustion engine that can be implemented in the propulsion system of an aircraft. For example, a gas turbine can be implemented in connection with a turbofan or a turbojet aircraft engine. Gas turbines also have significant applications in areas such as industrial power generation.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe example implementations and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, "vertical" refers to the direction perpendicular to the ground. As used herein, "horizontal" refers to the direction parallel to the centerline of the gas turbine engine 100. As used herein, "lateral" refers to the direction perpendicular to the axial and vertical directions (e.g., into and out of the plane of FIG. 1, etc.).

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.).

As used herein, the terms "axial" and "longitudinal" both refer to a direction parallel to the centerline axis of an gas turbine (e.g., a turbofan, a core gas turbine engine, etc.), while "radial" refers to a direction perpendicular to the axial direction, and "tangential" or "circumferential" refers to a direction mutually perpendicular to the axial and radial directions. Accordingly, as used herein, "radially inward" refers to the radial direction from the outer circumference of the gas turbine towards the centerline axis of the gas turbine, and "radially outward" refers to the radial direction from the centerline axis of the gas turbine towards the outer circumference of gas turbine. As used herein, the terms "forward", "fore", and "front" refer to a location relatively upstream in an air flow passing through or around a component, and the terms "aft" and "rear" refer to a location relatively downstream in an air flow passing through or around a component.

The basic operation of a gas turbine implemented in connection with a turbofan engine of a propulsion system of an aircraft includes an intake of fresh atmospheric air flow through the front of the turbofan engine with a fan. In the operation of a turbofan engine, a first portion of the intake air bypasses a core gas turbine engine of the turbofan to produce thrust directly. A second portion of the intake air travels through a booster compressor (e.g., a first compressor) located between the fan and a high-pressure compressor (e.g., a second compressor) in the core gas turbine engine (e.g., the gas turbine). The booster compressor is used to raise or boost the pressure of the second portion of the intake air prior to the air flow entering the high-pressure compressor. The air flow can then travel through the high-pressure compressor that further pressurizes the air flow. The booster compressor and the high-pressure compressor each include a group of blades attached to a rotor and/or shaft. The blades spin at high speed relative to stationary vanes and each subsequently compresses the air flow. The high-pressure compressor then feeds the pressurized air flow to a combustion chamber (e.g., combustor). In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow. A secondary use of the compressors, particularly the high-pressure compressor, is to bleed air for use in other systems of the aircraft (e.g., cabin pressure, heating, and air conditioning, etc.)

In the combustion chamber of the core gas turbine engine, the fuel is ignited with an electric spark provided by an igniter, where the fuel in some examples burns at temperatures of more than 2000 degrees Fahrenheit. The resulting combustion produces a high-temperature, high-pressure gas stream (e.g., hot combustion gas) that passes through another group of blades called a turbine. The turbine can include a low-pressure turbine and a high-pressure turbine, for example. Each of the low-pressure turbine and the high-pressure turbine includes an intricate array of alternating rotating blades and stationary airfoil-section blades (e.g., vanes). The high-pressure turbine is located axially downstream from the combustor and axially upstream from the low-pressure turbine. As the hot combustion gas passes through the turbine, the hot combustion gas expands through the blades and/or vanes, causing the rotating blades coupled to rotors of the high-pressure turbine and the low-pressure turbine to spin.

The rotating blades of the high-pressure turbine and the low-pressure turbine serve at least two purposes. A first purpose of the rotating blades is to drive the fan, the high-pressure compressor, and/or the booster compressor to draw more pressured air into the combustion chamber. For example, in a dual-spool design of a turbofan, the low-pressure turbine (e.g., a first turbine) can be attached to and in force transmitting connection with the booster compressor (e.g., the first compressor) and fan via a first shaft, collectively a first spool of the gas turbine, such that the rotation of a rotor of the low-pressure turbine drives a rotor of the booster compressor and the fan. For example, a high-pressure turbine (e.g., a second turbine) can be attached to and in force transmitting connection with the high-pressure compressor (e.g., a second compressor) via a second shaft coaxial with the first shaft, collectively a second spool of the gas turbine, such that the rotation of a rotor of the high-pressure turbine drives a rotor of the high-pressure compressor. A second purpose of the rotating blades is to spin a generator operatively coupled to the turbine section to produce electricity. For example, the turbine can generate electricity to be used by an aircraft, a power station, etc.

It is generally an object of the design of aircraft engines such as turbofans to compress as much air as is feasible within the compressor of the a core gas turbine engine given the static, dynamic, centrifugal and/or thermal stress limitations and weight considerations of aspects of the core gas turbine engine and/or the turbofan engine. A metric defining the compressive action of a compressor is a compression ratio (e.g., pressure ratio) of a compressor. The compression ratio of a compressor of a turbofan engine is the ratio of pressure at an outlet of the compressor (e.g., the outlet of the high-pressure compressor at the combustion chamber of the gas turbine) to pressure at an inlet of a fan. A higher compression ratio increases a thermal efficiency of the turbine engine and decreases a specific fuel consumption of the turbine engine (e.g., a ratio of fuel used to thrust produced by the jet engine). Thus, an increase in the compression ratio of the compressor of a gas turbine can increase thrust produced by a jet engine, such as a turbofan, etc., and/or can increase fuel efficiency of the jet engine. In turn, it is an object of gas turbine design to minimize or otherwise reduce pressure losses through the compressors to maximize or otherwise improve the compression ratio. Though examples disclosed herein are discussed in connection with a turbofan jet engine, it is understood that examples disclosed herein can be implemented in connection with a turbojet jet engine, a turboprop jet engine, a combustion turbine for power production, or any other suitable application where it is desired to increase compression ratios across one or more compressors.

The example low-pressure compressor and high-pressure compressor of the turbine engine of the turbofan each include one or more stages. Each stage includes an annular array of compressor blades (e.g., first airfoils) mounted about a central rotor paired with an annular array of stationary compressor vanes (e.g., second airfoils) spaced apart from the rotor and fixed to a casing of the compressor. At an aft portion of a compressor stage, rotation of the rotor and accompanying blades provides an increase in velocity, temperature, and pressure of air flow. At a fore portion of the compressor stage, the air flow diffuses (e.g., loses velocity) across compressor vanes providing for an increase in pressure. The implementation of multiple stages across the low-pressure compressor and high-pressure compressor provides for the compression ratios to operate a jet engine such as a turbofan.

In the example of the high-pressure compressor and the low-pressure compressor, compressor blades (also referred to herein as blades and/or dovetail blades) are arrayed about a corresponding high-pressure compressor rotor and low-pressure compressor rotor, respectively. The high-pressure rotor and accompanying compressor blades (e.g., blades, dovetail blades, etc.) are typically fashioned from Titanium alloys (e.g., a Titanium-Aluminum alloy, a Titanium-Chromium alloy, etc.) and/or Steel alloys (e.g., a Steel-Chromium alloy), etc. For example, to increase ease of maintenance and assembly, replaceability of blades, and/or modularity of the high-pressure compressor, discrete compressor blades are mounted in series annularly about the high-pressure rotor to achieve a substantially uniform distribution annularly about the rotor. For this purpose, an example compressor blade implemented in accordance with the teachings of this disclosure includes an airfoil portion and a mounting portion. The airfoil portion of the compressor blade causes the velocity, pressure, and temperature increase to the air flow.

The mounting portion of the compressor blade enables mounting of blade to the rotor. In some examples, the geometry of the airfoil portion and/or mounting portion can be different for the compressor blades of each stage of the high-pressure compressor and the same for the compressor blades within each stage of the high-pressure compressor.

In certain examples, the mounting portion of the example compressor blade includes a dovetail protrusion and a platform. In this example, the high-pressure compressor rotor is provided at each stage with a dovetail slot (e.g., also referred to herein as a slot) to receive the dovetail protrusions of a plurality of blades of the stage. For example, a compressor blade can be in a mounted state with a high-pressure rotor when the dovetail slot of the high-pressure compressor rotor receives the dovetail protrusion of the compressor blade. In this example, the dovetail protrusion of the blade defines a radially outer portion (e.g., a portion relatively radially outward when mounted) and a radially inner portion (e.g., a portion relatively radially inward when mounted). In this example, the radially outer portion is relatively less in axial length (e.g., when mounted, the length in the axial direction of the turbine engine and/or compressor) than the radially inner portion. The dovetail slot also includes a radially outer portion and a radially inner portion. For example, the radially outer portion can include a pair of annular flanges (e.g., a neck, a first neck, etc.) extending axially towards the center of the dovetail slot. The dimensions of the compressor blade and the dovetail slot are such that when the compressor blade is in a mounted state with the compressor blade, the annular flanges (e.g., a neck) of the dovetail slot interfere with the radially inner portion of the compressor blade, thereby retaining the compressor blade from radially outward movement.

Traditionally, a plurality of compressor blades of a stage are mounted annularly in a dovetail slot directly in series such that the platform of each blade interfaces with the platform of a first subsequent blade on a first circumferential side and interfaces with the platform of a second subsequent blade on a second circumferential side.

Though examples disclosed herein are discussed in connection with dovetail slots of a rotor of a high-pressure compressor of a core gas turbine engine of a turbofan engine, other examples can be implemented in accordance with the teachings of the present disclosure for a low-pressure compressor, an intermediate-pressure compressor, a sole compressor of a single spool gas turbine, a compressor with an alternative slot design, a compressor of a gas turbine for industrial power production, a turbine rotor and/or any other suitable application.

A challenge for an open rotor engine is to create a secure loading mechanism to retain blades in their slots. Examples disclosed and described herein provide various mechanisms (e.g., referred to as a blade retention apparatus, retention device, etc.) to keep a rotor blade in an engine slot.

Advantages to these configurations include keeping a blade loaded in a dovetail slot such as in instances of low rpm, where proper seating of the blade in the slot is reduced and an excitation force may be high such as in propeller or open-rotor applications. In propeller or open-rotor engine applications, for example, a high vibratory load is experienced during various phases of the flight due to asymmetric propeller loading (e.g., P-Factor or 1P loading). 1P loading, also referred to as +/−1P loading, refers to movement or force on a blade caused by a blade's excitation frequency relative to rotor revolution, which often occurs during take-off rotation.

Further, existing turboprop or open rotor technology requires that when there is a failure of a blade, the single blade cannot be removed. Instead, a complex disassembly process must be completed to remove a single fan blade, which increases the time and work required to service the equipment. In contrast, certain examples enable blades to individually be retained and removed from a blade assembly for servicing, repair, replacement, etc.

Example retaining mechanisms can be applied to both closed and open rotor engine designs. For purposes of illustration only, FIG. 1A illustrates an example closed-rotor turbofan engine, and FIG. 1B illustrates an example open-rotor engine.

Figure 1B:
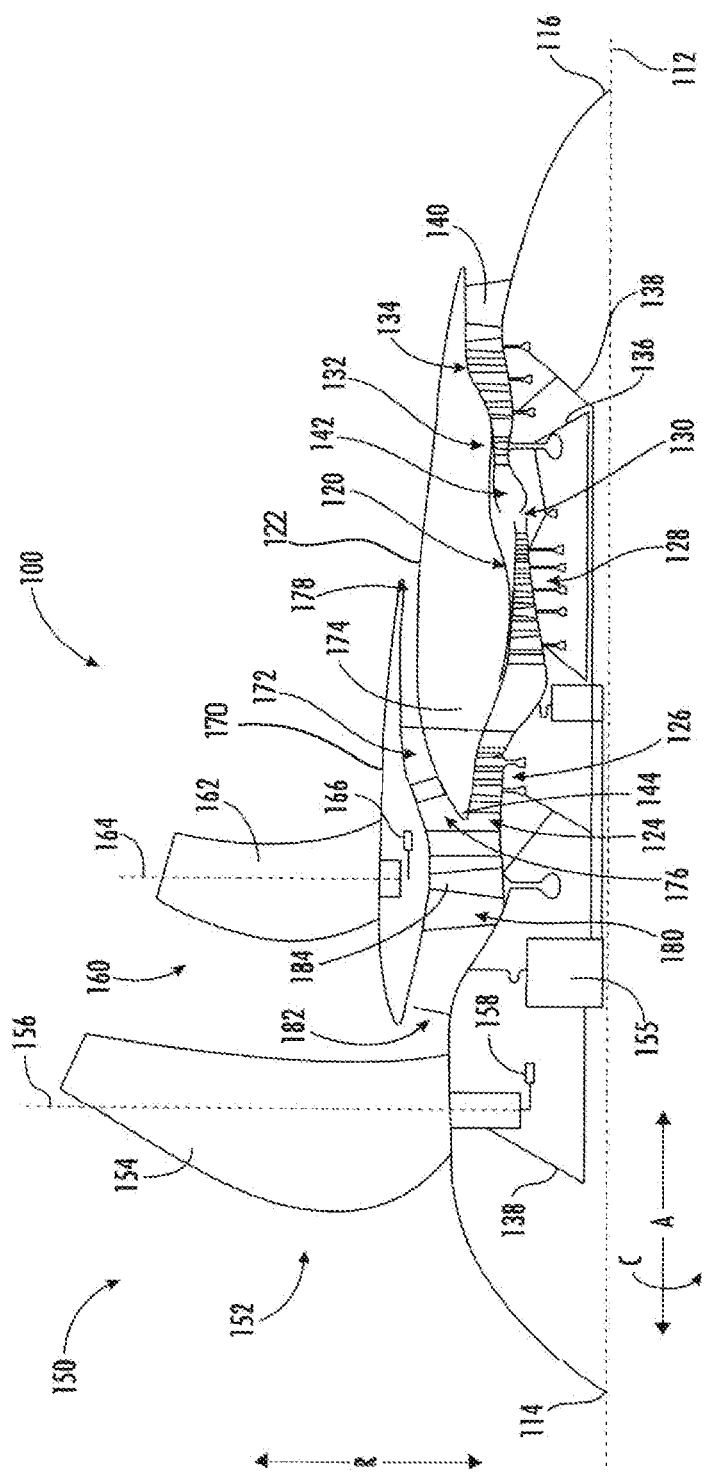
FIG. 1B illustrates an example cross-section view of an example open rotor engine.

FIG. 1A is a schematic partially cross-sectioned side view of an example turbofan gas turbine engine 10. The engine 10 may particularly be configured as a gas turbine engine for an aircraft. Although further described herein as a turbofan engine, the engine 10 may define a turboshaft, turboprop, or turbojet gas turbine engine, including marine and industrial engines and auxiliary power units. As shown in FIG. 1A, the engine 10 has a longitudinal or axial centerline axis 12 that extends therethrough for reference purposes. An axial direction A is extended co-directional to the axial centerline axis 12 for reference. The engine 10 further defines an upstream end 99 and a downstream end 98 for reference. In general, the engine 10 may include a fan assembly 14 and a core engine 16 disposed downstream from the fan assembly 14. For reference, the engine 10 defines an axial direction A, a radial direction R, and a circumferential direction C. In general, the axial direction A extends parallel to the axial centerline 12, the radial direction R extends outward from and inward to the axial centerline 12 in a direction orthogonal to the axial direction A, and the circumferential direction extends three hundred sixty degrees (360°) around the axial centerline 12.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a heat addition system 26, an expansion section or turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In certain examples, as shown in FIG. 1A, the LP rotor shaft 36 may be connected to the fan shaft 38 via a reduction gear 40 such as in an indirect-drive or geared-drive configuration.

As shown in FIG. 1A, the fan assembly 14 includes a plurality of fan blades 42 that are coupled to and that extend radially outwardly from the fan shaft 38. An annular fan casing or nacelle 44 circumferentially may surround the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a fan flow passage 48 therebetween. However, it should be appreciated that various configurations of the engine 10 may omit the nacelle 44, or omit the nacelle 44 from extending around the fan blades 42, such as to provide an open rotor or propfan configuration of the engine 10 depicted in FIG. 1B.

It should be appreciated that combinations of the shafts 34, 36, the compressors 22, 24, and the turbines 28, 30 define a rotor assembly 90 of the engine 10. For example, the HP shaft 34, HP compressor 24, and HP turbine 28 may define a high speed or HP rotor assembly of the engine 10. Similarly, combinations of the LP shaft 36, LP compressor 22, and LP turbine 30 may define a low speed or LP rotor assembly of the engine 10. Various examples of the engine 10 may further include the fan shaft 38 and fan blades 42 as the LP rotor assembly. In certain examples, the engine 10 may further define a fan rotor assembly at least partially mechanically de-coupled from the LP spool via the fan shaft 38 and the reduction gear 40. Still further examples may further define one or more intermediate rotor assemblies defined by an intermediate pressure compressor, an intermediate pressure shaft, and an intermediate pressure turbine disposed between the LP rotor assembly and the HP rotor assembly (relative to serial aerodynamic flow arrangement).

During operation of the engine 10, a flow of air, shown schematically by arrows 74, enters an inlet 76 of the engine 10 defined by the fan case or nacelle 44. A portion of air, shown schematically by arrow 80, enters the core engine 16 through a core inlet 20 defined at least partially via the outer casing 18. The flow of air is provided in serial flow through the compressors, the heat addition system, and the expansion section via a core flowpath 70. The flow of air 80 is increasingly compressed as it flows across successive stages of the compressors 22, 24, such as shown schematically by arrows 82. The compressed air 82 enters the heat addition system 26 and mixes with a liquid and/or gaseous fuel and is ignited to produce combustion gases 86. It should be appreciated that the heat addition system 26 may form any appropriate system for generating combustion gases, including, but not limited to, deflagrative or detonative combustion systems, or combinations thereof. The heat addition system 26 may include annular, can, can-annular, trapped vortex, involute or scroll, rich burn, lean burn, rotating detonation, or pulse detonation configurations, or combinations thereof.

The combustion gases 86 release energy to drive rotation of the HP rotor assembly and the LP rotor assembly before exhausting from the jet exhaust nozzle section 32. The release of energy from the combustion gases 86 further drives rotation of the fan assembly 14, including the fan blades 42. A portion of the air 74 bypasses the core engine 16 and flows across the fan flow passage 48, such as shown schematically by arrows 78.

It should be appreciated that FIG. 1A depicts and describes a two-stream engine having the fan flow passage 48 and the core flowpath 70. The example depicted in FIG. 1A has a nacelle 44 surrounding the fan blades 42, such as to provide noise attenuation, blade-out protection, and other benefits known for nacelles, and which may be referred to herein as a "ducted fan," or the entire engine 10 may be referred to as a "ducted engine."

FIG. 1B provides a schematic cross-sectional view of an example open-rotor turbine engine according to one example of the present disclosure. Particularly, FIG. 1B provides an aviation three-stream turbofan engine herein referred to as "three-stream engine 100". The three-stream engine 100 of FIG. 1B can be mounted to an aerial vehicle, such as a fixed-wing aircraft, and can produce thrust for propulsion of the aerial vehicle. The architecture of the three-stream engine 100 provides three distinct streams of thrust-producing airflow during operation. Unlike the engine 10 shown in FIG. 1A, the three-stream engine 100 includes a fan that is not ducted by a nacelle or cowl, such that it may be referred to herein as an "unducted fan," or the entire engine 100 may be referred to as an "unducted engine."

For reference, the three-stream engine 100 defines an axial direction A, a radial direction R, and a circumferential direction C. Moreover, the three-stream engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The three-stream engine 100 extends between a forward end 114 and an aft end 116, e.g., along the axial direction A.

The three-stream engine 100 includes a core engine 120 and a fan section 150 positioned upstream thereof. Generally, the core engine 120 includes, in serial flow order, a compressor section, a combustion section, a turbine section, and an exhaust section. Particularly, as shown in FIG. 1B, the core engine 120 includes a core cowl 122 that defines an annular core inlet 124. The core cowl 122 further encloses a low pressure system and a high pressure system. In certain examples, the core cowl 122 may enclose and support a booster or low pressure ("LP") compressor 126 for pressurizing the air that enters the core engine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 where fuel is injected into the pressurized air stream and ignited to raise the temperature and energy level of the pressurized air. It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example. After driving each of the turbines 132, 134, the combustion products exit the core engine 120 through a core exhaust nozzle 140 to produce propulsive thrust. Accordingly, the core engine 120 defines a core flowpath or core duct 142 that extends between the core inlet 124 and the core exhaust nozzle 140. The core duct 142 is an annular duct positioned generally inward of the core cowl 122 along the radial direction R.

The fan section 150 includes a fan 152, which is the primary fan in this example. For the depicted example of FIG. 1B, the fan 152 is an open rotor or unducted fan. However, in other examples, the fan 152 may be ducted, e.g., by a fan casing or nacelle circumferentially surrounding the fan 152. As depicted, the fan 152 includes an array of fan blades 154 (only one shown in FIG. 1B). The fan blades 154 are rotatable, e.g., about the longitudinal axis 112. As noted above, the fan 152 is drivingly coupled with the low pressure turbine 134 via the LP shaft 138. The fan 152 can be directly coupled with the LP shaft 138, e.g., in a direct-drive configuration. Optionally, as shown in FIG. 1B, the fan 152 can be coupled with the LP shaft 138 via a speed reduction gearbox 155, e.g., in an indirect-drive or geared-drive configuration.

Moreover, the fan blades 154 can be arranged in equal spacing around the longitudinal axis 112. Each blade 154 has a root and a tip and a span defined therebetween. Each blade 154 defines a central blade axis 156. For this example, each blade 154 of the fan 152 is rotatable about its respective central blade axes 156, e.g., in unison with one another. One or more actuators 158 can be controlled to pitch the blades 154 about their respective central blade axes 156. However, in other examples, each blade 154 may be fixed or unable to be pitched about its central blade axis 156.

The fan section 150 further includes a fan guide vane array 160 that includes fan guide vanes 162 (only one shown in FIG. 1B) disposed around the longitudinal axis 112. For this example, the fan guide vanes 162 are not rotatable about the longitudinal axis 112. Each fan guide vane 162 has a root and a tip and a span defined therebetween. The fan guide vanes 162 may be unshrouded as shown in FIG. 1B or may be shrouded, e.g., by an annular shroud spaced outward from the tips of the fan guide vanes 162 along the radial direction R. Each fan guide vane 162 defines a central blade axis 164. For this example, each fan guide vane 162 of the fan guide vane array 160 is rotatable about its respective central blade axes 164, e.g., in unison with one another. One or more actuators 166 can be controlled to pitch the fan guide vane 162 about their respective central blade axes 164. However, in other examples, each fan guide vane 162 may be fixed or unable to be pitched about its central blade axis 164. The fan guide vanes 162 are mounted to a fan cowl 170.

As shown in FIG. 1B, in addition to the fan 152, which is unducted, a ducted fan 184 is included aft of the fan 152, such that the three-stream engine 100 includes both a ducted and an unducted fan that both serve to generate thrust through the movement of air without passage through core engine 120. The ducted fan 184 is shown at about the same axial location as the fan guide vane 162, and radially inward of the fan guide vane 162. Alternatively, the ducted fan 184 may be between the fan guide vane 162 and core duct 142, or be farther forward of the fan guide vane 162. The ducted fan 184 may be driven by the low pressure turbine 134 (e.g., coupled to the LP shaft 138), or by any other suitable source of rotation, and may serve as the first stage of booster or may be operated separately.

The fan cowl 170 annularly encases at least a portion of the core cowl 122 and is generally positioned outward of the core cowl 122 along the radial direction R. Particularly, a downstream section of the fan cowl 170 extends over a forward portion of the core cowl 122 to define a fan flowpath or fan duct 172. Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The stationary struts 174 may each be aerodynamically contoured to direct air flowing thereby. Other struts in addition to the stationary struts 174 may be used to connect and support the fan cowl 170 and/or core cowl 122. In many examples, the fan duct 172 and the core duct 122 may at least partially co-extend (generally axially) on opposite sides (e.g., opposite radial sides) of the core cowl 122. For example, the fan duct 172 and the core duct 122 may each extend directly from the leading edge 144 of the core cowl 122 and may partially co-extend generally axially on opposite radial sides of the core cowl.

The three-stream engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the array of fan guide vanes 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

Example Dovetail and Slot Configurations

Figure 2:
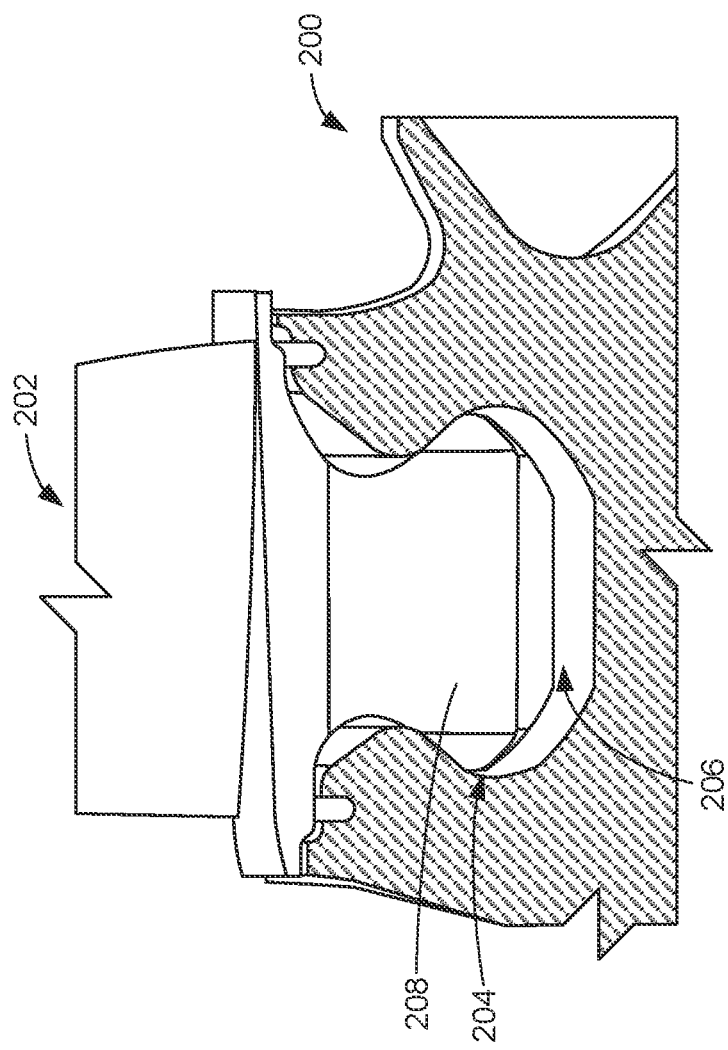
FIG. 2 is a partial cross section of an example high-pressure compressor rotor depicting a compressor dovetail slot.

FIG. 2 is a partial cross section of an example high-pressure compressor rotor depicting a compressor dovetail slot. In the example of FIG. 2, one or more compressor blades 202 are mounted on the high-pressure compressor rotor 200. In the view of FIG. 2, the fore direction is to the left, and the aft direction is to the right. An example dovetail slot 204 includes a lower cavity 206. A dovetail protrusion 208 fits in the lower cavity 206 of the example dovetail slot 204.

Certain examples provide improved dovetail seating in a slot. Certain examples provide dovetail seating adding a radial load to the dovetail of the blade. In certain examples, a radial load is added to the dovetail in combination with an axial retention feature. The radial loading keeps the dovetail seated during large applied moments at low revolutions per minute (RPM). In certain examples, in an open rotor configuration, a high radial load is provided to prevent unseating of the blade and its dovetail from its slot.

Current configurations, such as beam or clank springs can provide some radial load under windmill conditions but cannot provide sufficient radial load to reliably maintain the blade in the slot. Current configurations are not locking or self-adjusting. In contrast, certain examples provide sufficient radial load to maintain the dovetail of the blade in the slot. Certain examples are locking and self-adjusting.

In certain examples, an open rotor blade may be subjected to a variety of conditions such as low tip speed, high propeller alternating loads, reverse thrust, etc., which can cause the dovetail to unseat from the slot or socket and result in rapid wear of the dovetail and blade. Certain examples provide a mechanism to increase the seating force on the dovetail to prevent movement under normal vibratory and/or reverse thrust load conditions.

Certain examples provide a spacer that fits underneath the blade and has a tapered slot with a wedge inside. Movement of the wedge changes the effective thickness of the spacer. A pre-loaded spring pulls on the wedge expanding the spacer so exerting force on the blade root. Manufacturing variations are automatically compensated for by the nature of the wedge/spring arrangement. Changes in part dimensions during service due to wear or creep are similarly accommodated.

Certain examples provide a radial clamp, which is locking such that it does not compress under reaction load. The radial clamp is also self-adjusting to compensate for component wear, compliance, creep, temperature, manufacturing variance, etc., while operating in a small envelope. Certain examples provide expanding wedges.

As such, certain examples provide a preload mechanism to prevent unseating and/or wear in blade dovetails. Alternatively or additionally, certain examples adjust a pitch axis to reduce or minimize a range of moments.

Figure 3B:
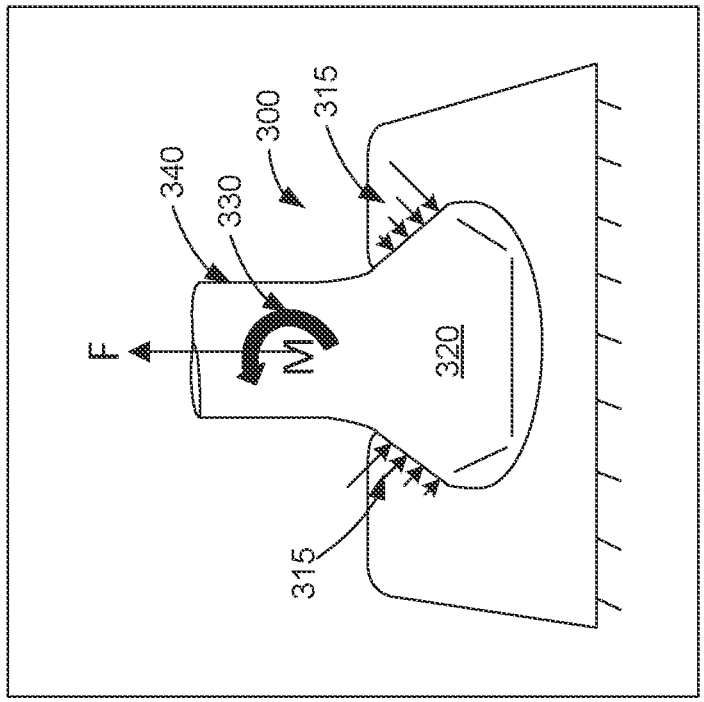
FIGS. 3A-4B illustrate example forces and moments acting on a blade dovetail.
Figure 3A:
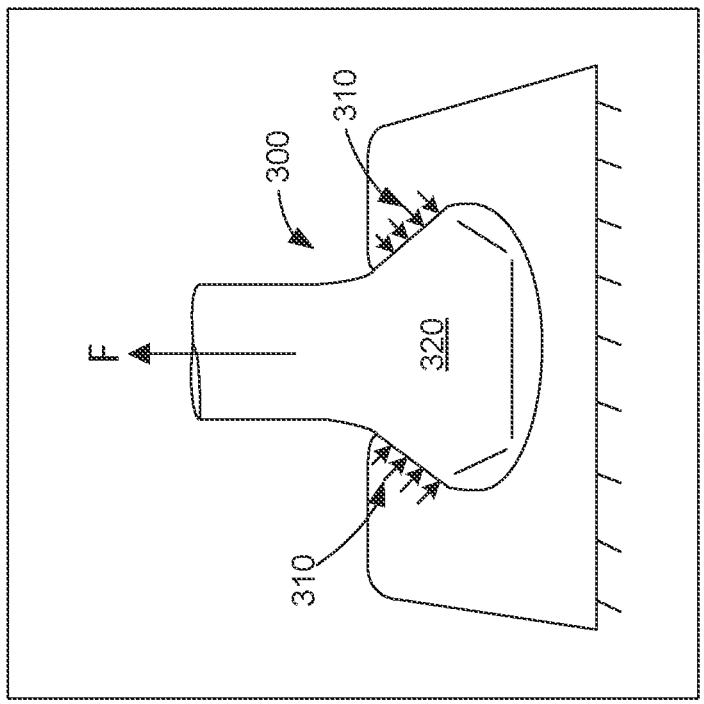

FIG. 3A illustrates an example dovetail/slot attachment 300 with rigid materials and a radial load. As shown in the example 300, a contact force distribution 310 across pressure faces of the dovetail 320 is approximately uniform. As shown in the example of FIG. 3B, addition of a moment 330 to a shank 340 of the blade changes the contact force distribution 315 to react the moment 330.

Figure 4A:
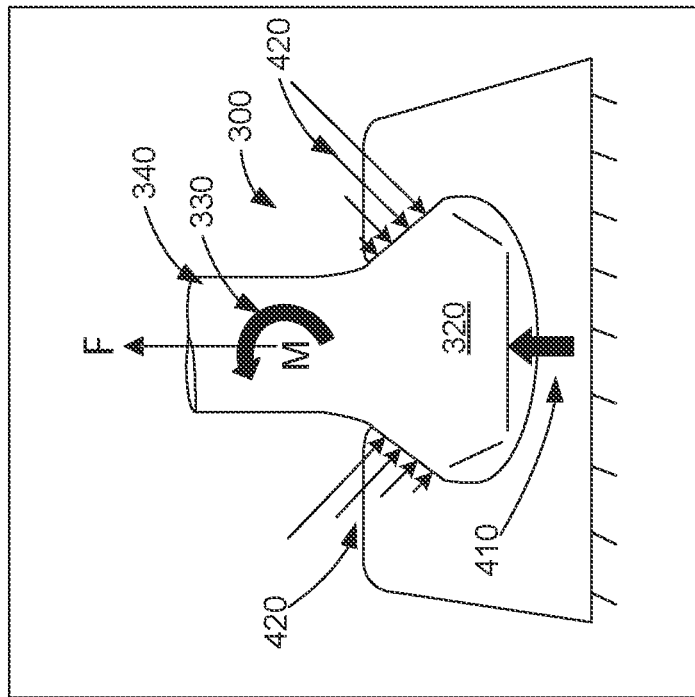
Figure 4B:
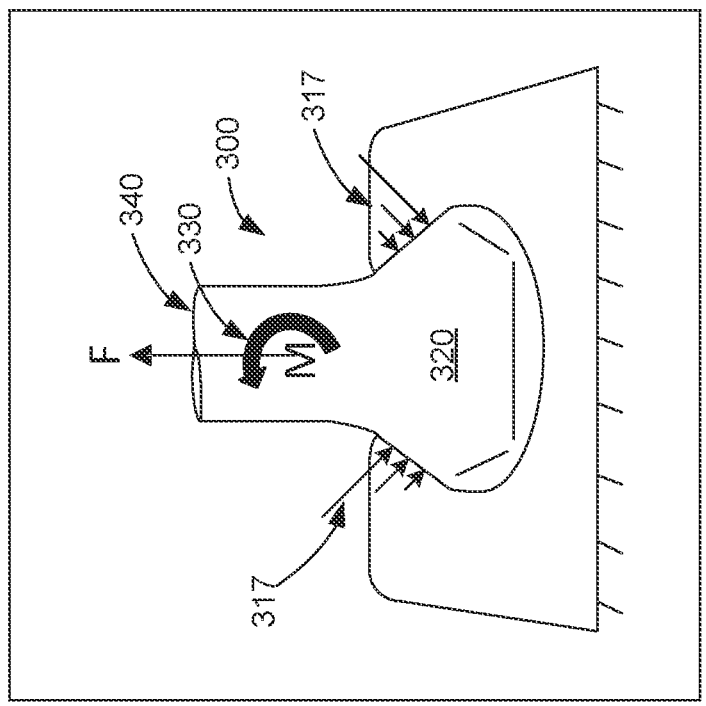

As shown in the example of FIG. 4A, if the moment 330 becomes large enough, the contact force 317 becomes zero along the edges of the pressure-faces, which lose or loosen contact and start to open up. If this is the result of a vibratory load (1P), it may lead to movement and rapid wear of the blade. As shown in the example of FIG. 4B, by adding to the radial load 410, the moment carrying capability 420 before loss of edge contact can be increased, at the expense of average and peak contact pressure.

Propeller blades have a big range of moments that have to be reacted. A dovetail attachment can be provided with a radial force 410 to keep the dovetail in the slot and prevent or reduce rocking due to the moment 330, which in turn reduces wear and associated failure and maintenance, for example.

Figure 5:
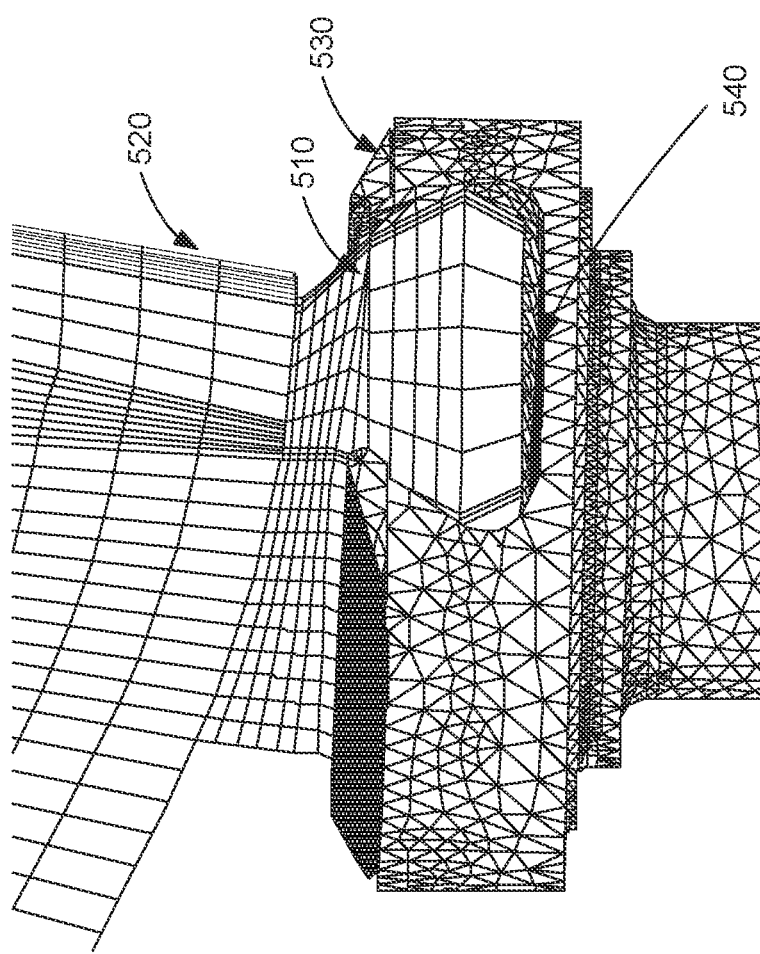
FIG. 5 illustrates an example in which a dovetail of a rotor or blade fits in a slot.

FIG. 5 illustrates an example in which a dovetail 510 of a rotor or blade 520 fits in a slot, also referred to as a trunnion 530. A space 540 between the bottom of the dovetail 510 and the cavity of the trunnion 530 can contribute to motion of the dovetail 510. To compensate for this motion (e.g., due to pressure, vibration, etc.), an insert, such as a lock, etc., can be added.

A locking spacer, for example, can fill the space 540 and apply a preload to the dovetail 510 in the slot/socket/trunnion 530. The locking spacer can provide a radial clamping force in a small envelope to compensate for component wear, compliance, creep in the trunnion 530, etc. The locking spacer can be insensitive to temperature, lightweight, and enable dis-assembly without lock up or complication to remove a blade 520 from its trunnion 530, for example.

Example Self-Adjusting, Locking Spacer

Figure 6A:
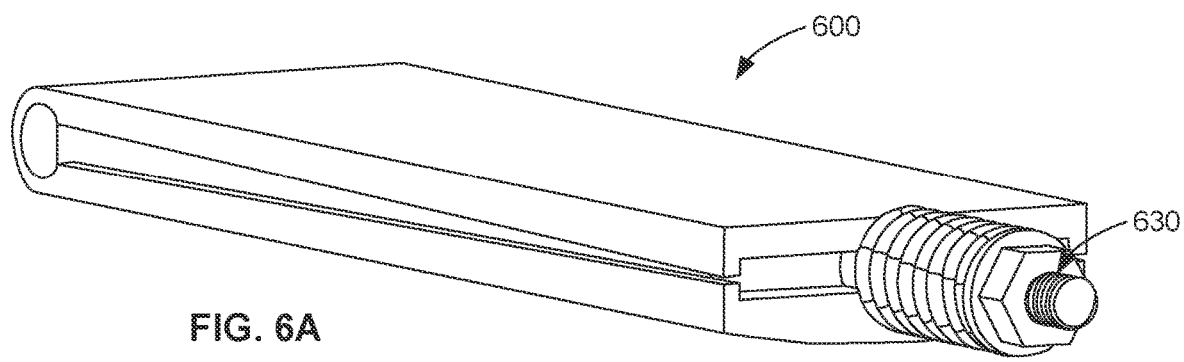
FIGS. 6A-6C show views of an example self-adjusting, locking spacer apparatus.
Figure 6B:
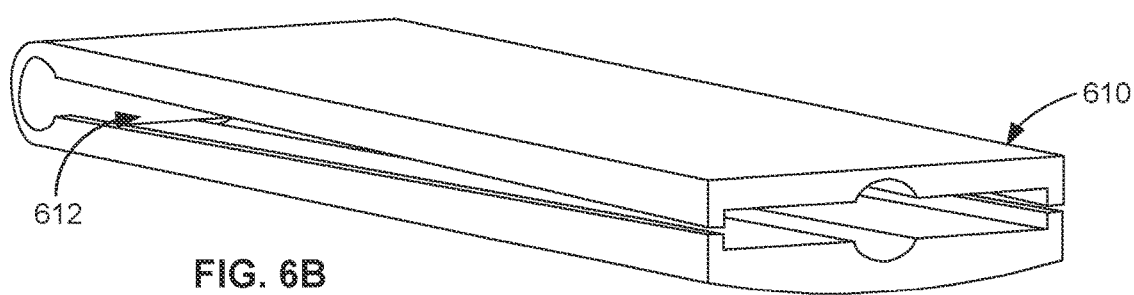
Figure 6C:
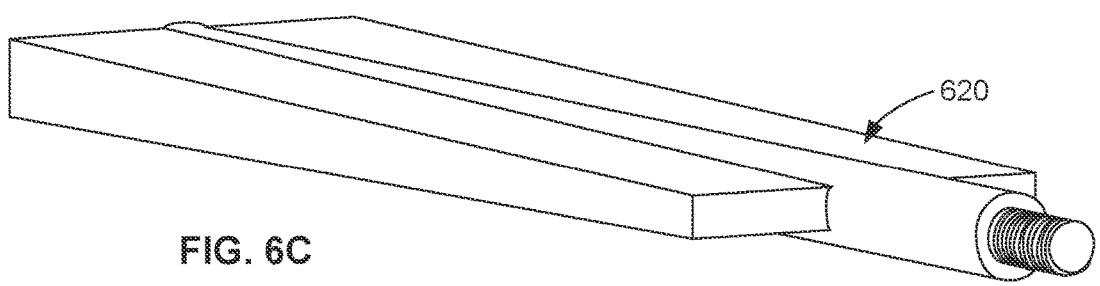

FIGS. 6A-6C show views of an example self-adjusting, locking spacer apparatus 600. The example spacer apparatus 600 can be inserted into the space 540 and locked to reduce or inhibit movement of the dovetail 510 in the trunnion 530 (e.g., serving as a preload or retaining device helping to retain the dovetail 510 in the trunnion/slot/socket 530). The example spacer apparatus 600 includes a spacer 610, a wedge 620, and a spring 630. The spring 630, which can be set at assembly, maintenance, etc., pulls the wedge 620 through the spacer 610 to provide a pre-load to keep the dovetail 510 of the blade 520 in the slot/trunnion 530 to help ensure compliance and reduce wear. The material, tension, bend, etc., of the spacer 610, wedge 620, and/or spring 630 can vary based on a size of the gap or space 540, the dovetail 510, the blade 520, and/or the trunnion 530, for example. The wedge 620 fits inside the spacer 610, and, when the spring 630 tightens, the spring 630 pulls the wedge 620 to expand the spacer 610 (e.g., in the space or gap 540). The spring 630 creates a radial force (e.g., a radial preload force) on the bottom of the blade 520 and can accommodate changes in the space 540 by greater or lesser pulling of the wedge 620 with the spring 630. The wedge 620 generates an axial load on the blade 520 as well, so that the combination of radial and axial forces from the spring 630 and the wedge 620 act to keep the blade 520 in position. As force increases, the wedge 620 will not slide back due to strength of friction exerted on the wedge 620 with respect to the spacer 610 (e.g., making the spacer 610 self-locking). If reaction increases, the wedge 620 does not compress. The combination of spacer 610, the wedge 620, and the spring 630 can accommodate changes in distance due to wear, heat, etc. Choice of spacer 610, wedge 620, and spring 630 determine a range of the locking spacer apparatus 600, for example.

In certain examples, the spacer 610, wedge 620, and/or spring 630 are metallic. However, depending on the space 540 and total force involved, one or more of the spacer 610, the wedge 620, and/or the spring 630 can be non-metallic. For example, the spacer 610 and/or the wedge 620 can be formed of titanium, aluminum, a composite, etc. The spring 630 can be formed of a laminated composite, for example. Coating(s) can be applied to surface(s) to control wear and friction (e.g., Teflon®-impregnated Nomex® or glass cloth, molybdenum paint, no coating (e.g., bare), etc.). In certain examples, the spacer 610 is formed in a curve (e.g., could also be an S-curve). The spacer 610 can be formed as a single piece that is bent, etc., and/or as two parts joined together with a hinge and/or other connection. The spacer 610, the wedge 620, the spring 630, etc., can be machine, injection molded, additively manufactured, etc.

As such, rather than a flexible beam spring, the locking spacer assembly 600 provides a locking, self-adjusting mechanism to apply a radial load to the dovetail 510 in the trunnion 530. The example apparatus 600 forms an expanding wedge that increases a seating force on the dovetail 510 to help keep the dovetail 510 in the trunnion or slot 530 under vibratory and/or reverse thrust load conditions, for example. The spacer wedge assembly 600 fits underneath the blade dovetail 510 and has a tapered slot 612 with the wedge 620 inside. Movement of the wedge 620 changes the effective thickness of the spacer 610. A pre-loaded spring 630 pulls on the wedge 620 to expand the spacer 610 and exert force on the blade root 510. Manufacturing variations are automatically compensated for by the wedge 620/spring 630 arrangement. Changes in part dimension during service due to wear or creep are similarly accommodated by the wedge 620/spring 630 combination with the spacer 610, for example. The added axial force, alone or in conjunction with a radial force, depending on the configuration, overcome an unseating moment to hold the blade dovetail 510 in position.

As such, certain examples provide a retaining system for a blade of an engine. The example retaining system includes means, such as the spacer 610, for spacing to be positioned in a socket with an end of a blade. The example retaining system includes means, such as the wedge 620, for wedging positioned inside the means for spacing. The example retaining system includes means, such as the spring 630, for tightening to pull the means for wedging to expand the means for spacing.

Other examples can be implemented as alternatives and/or in addition to the locking spacer apparatus 600 described above. For example, a collet or holder can be used with a trunnion, socket, or other slot to secure the dovetail of a blade.

Example Radial and/or Axial Preloading

Figure 7:
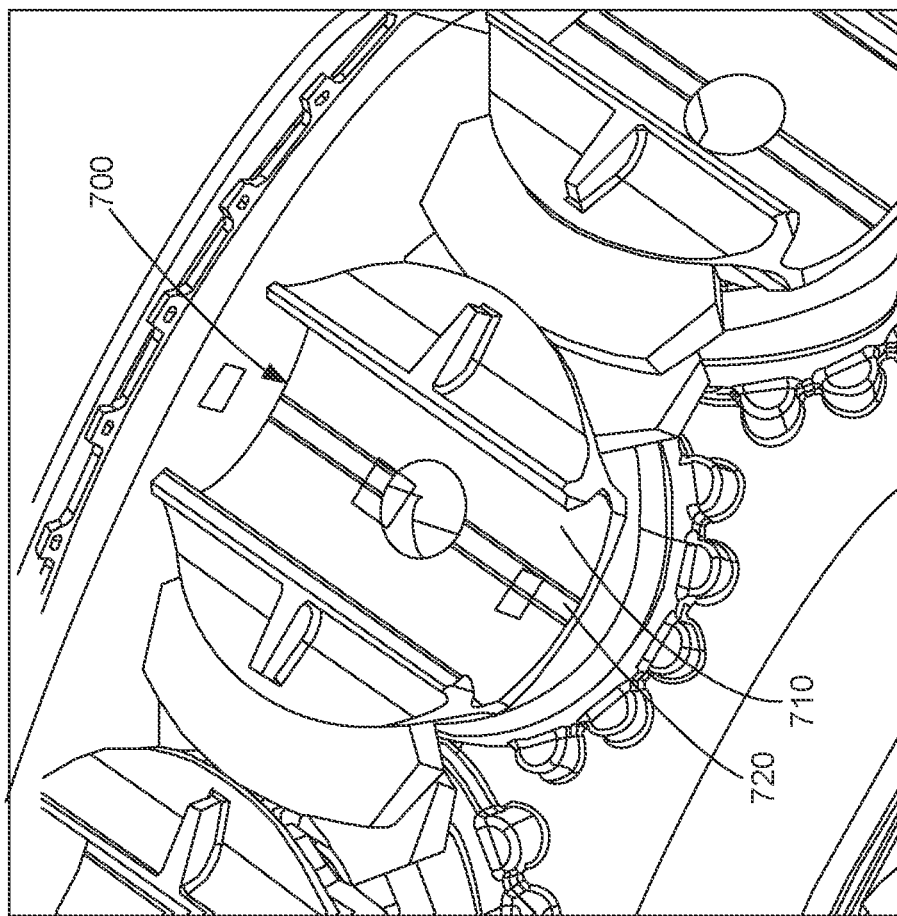
FIG. 7 shows an example collet or holder for a blade dovetail.

FIG. 7 shows an example collet or holder 700 for a blade dovetail. Rather than an integral or circular collet, certain examples provide a slotted, counterweighted collet 700 to secure the dovetail 510 of the blade 520. Using the example counterweighted collet 700, the dovetail slides into a fixture 710 and a slot 720 forming the collet 700. The counterweighted collet 700 provides a radial force to keep the dovetail 510 seated during large applied moments at low RPM, for example.

Figure 8:
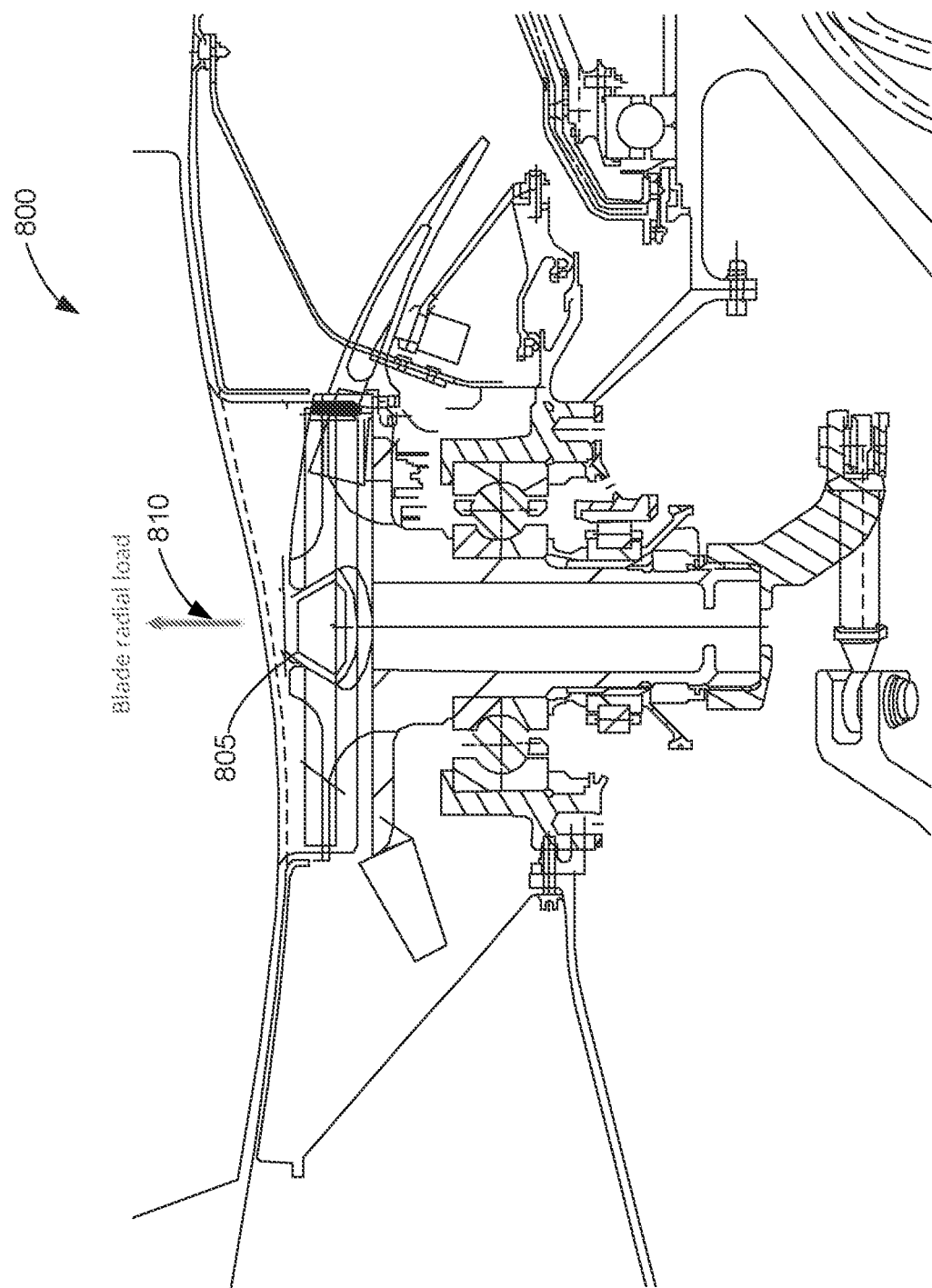
FIG. 8 depicts an example engine cross-section in which the collet configuration of FIG. 7 can be implemented.

FIG. 8 depicts an example engine cross-section 800 in which the collet 700 configuration can be implemented. The example cross-section 800 shows an example blade 805 and its associated radial load 810. The blade radial load 810 can be reacted using a variety of radial and/or axial preload devices as described herein.

Figure 9:
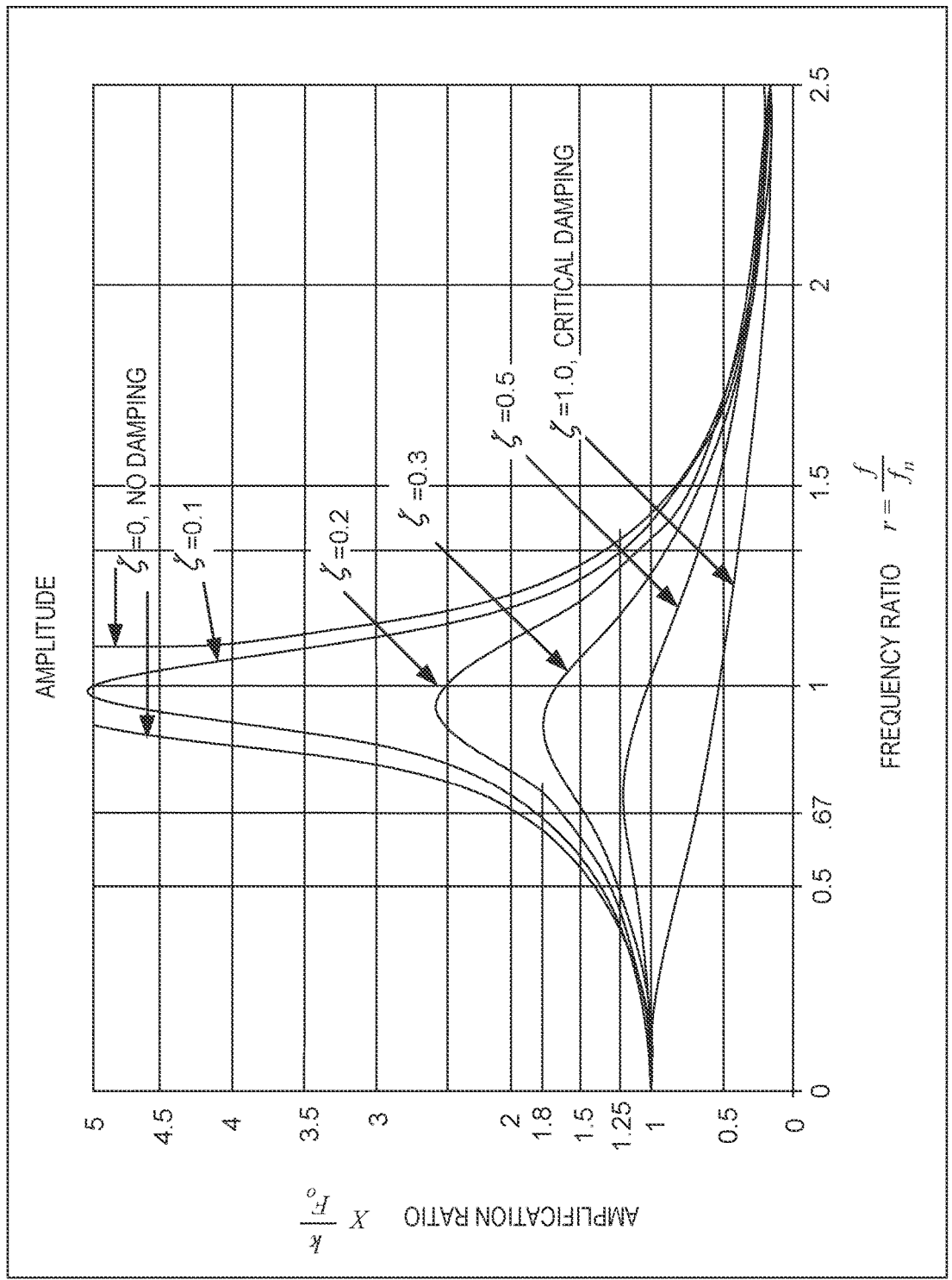
FIG. 9 shows an example graph of amplification ratio versus frequency ratio experienced by an example blade dovetail.

FIG. 9 shows an example graph of amplification ratio versus frequency ratio experienced by an example blade dovetail when exposed to no damping, some damping critical damping, etc. (as indicated by variable A large frequency/amplification margin (1F/1R) can be accommodated according to certain examples disclosed herein to handle increased blade loading, particularly in an open rotor configuration such as shown in the example of FIG. 8, while preventing the dovetail from being unseated. For example, an open rotor P factor is caused by an angle of attack (AoA) of the blade during rotation. Increased blade loading (1/F) can result, which has a tendency to unseat a traditional dovetail. As such, there is an incentive to maintain a large 1F/1R margin. The P factor and associated blade loading and unseating can be countered by a preload mechanism such as described herein.

Figure 10A:
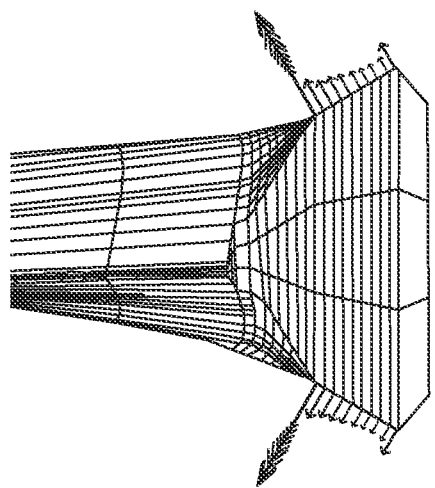
FIGS. 10A-10C illustrate differences in dovetail loading with respect to a baseline.
Figure 10B:
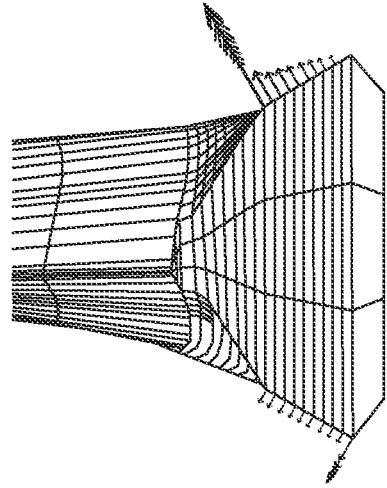
Figure 10C:
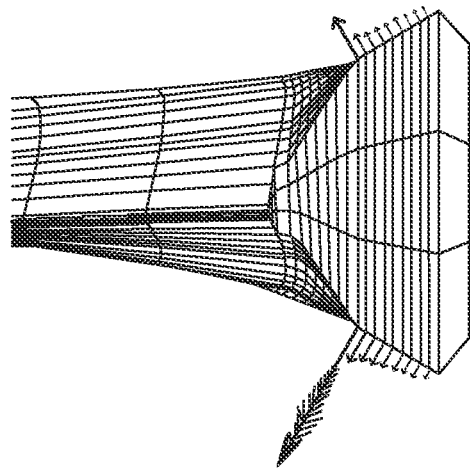
Figure 10A:
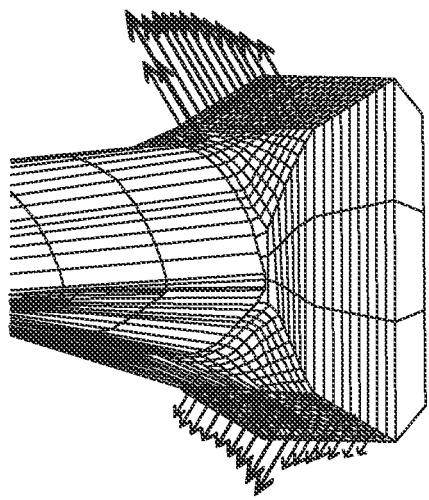
Figure 10B:
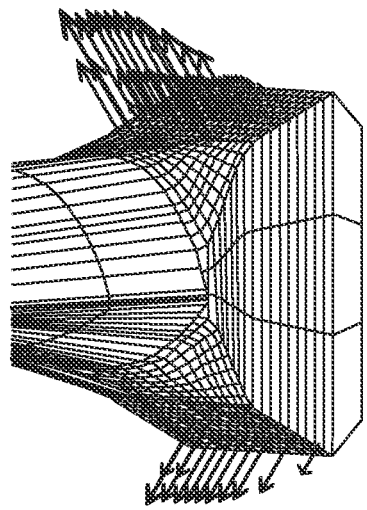
Figure 10C:
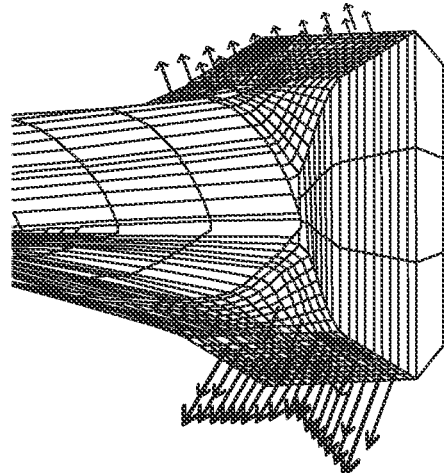

FIGS. 10A-10C illustrate differences in dovetail loading with respect to a baseline, plus or minus P loading. For example, FIG. 10A illustrates a load or force at takeoff or baseline. FIG. 10B shows an example takeoff force plus an asymmetric blade effect P (e.g., takeoff+1P). FIG. 10C shows an example takeoff force minus asymmetric blade effect P (e.g., takeoff−1P).

Example Collet-Based Configurations

In certain examples, both radial and axial preloads can be applied to a blade dovetail using a ram. FIGS. 11A-11C illustrate example blade dovetail axial and radial retention configurations that can be used alternatively and/or additionally to the configurations of FIGS. 6A-6C, etc. By using the configurations in combination, for example, both radial and axial forces can be applied to retain the blade in its trunnion or slot.

The example of FIG. 11A depicts a double wedge configuration with a mechanical screw to secure the dovetail of the blade 1110 with respect to a collet 1120. In the example of FIG. 11A, turning a screw 1130 pulls in a wedge or ram 1140 to separate an upper taper 1 and a lower taper 2. The screw 1130 can be turned and set at assembly, upon maintenance, etc. Pulling the wedge/ram 1140 separates the tapers 1 and 2, seats the blade 1110 in the collet 1120, and engages axial tabs 1150, 1155 to secure the blade 1110.

In the example of FIG. 11B, a screw or plunger 1130 is movable from the bottom of the collet 1120 to push upward on the ram 1140. Pressure from the ram 1140 created by the screw/plunger 1130 helps to secure the blade 1110. As such, rather than pulling the ram 1140 as in the example of FIG. 11A, the configuration of FIG. 11B positions the screw 1130 underneath the ram 1140 and utilizes movement of the screw to push upward on the ram 1140 to apply pressure to blade 1110 to keep the blade 1110 seated with respect to the collet 1120.

In the example of FIG. 11C, a spring 1160 is provided instead of the tapers of FIG. 11A. The ram 1140 is pushed in to push out the spring 1160 and seat the blade 1110 with respect to the collet 1120. The spring 1160 allows some movement while providing at least an axial force with the ram 1140 to keep the blade 1110 seated with respect to the collet 1120.

As such, the examples of FIGS. 11A-11C generate axial and/or radial force greater than an unseating moment (e.g., greater than an unseating moment by at least 1.5, etc.) to hold the blade 1110 in place with respect to the collet 1120. The example designs accommodate low RPM blade seating with vibrational pressure loading (e.g., between 1.5-4× aero load, etc.), while being serviceable for on-wing blade removal. Axial retention is incorporated to aid in collet sizing, for example. The example configurations can be applied to open rotor blades/propellers, short nacelles (e.g., with significant loading >1.2× aero load, etc.), dovetail interfaces, etc., with combined axial and radial retention, for example.

FIGS. 12A-12B illustrate an example parameterization with respect to ram loads (e.g., the ram 1140 of the examples of FIGS. 11A-11C). For example, airfoil and aero loads want to unseat an airfoil from its slot. Certain examples provide a ram force to keep the airfoil seated at all times. As shown in the example of FIGS. 12A-12B, a minimum ram force can be determined to provide a workable spring-dovetail-collet configuration. For example, a conventional spring puts a few thousand pounds of force on a blade to keep the blade seated during windmilling of the rotor on the tarmac (e.g., when wind is blowing and moving the blades). When the blade is spun up with power, the weight of the blade seats the blade in the slot, and the associated conventional spring has no effect on the blade. To remedy the deficiencies of a conventional spring, certain examples provide an improved spring that is applying force to the blade throughout windmilling, engaged spinning, and other exposure to force. This can be parameterized as illustrated in the example of FIGS. 12A-12B.

For example, as shown in FIG. 12A, an aero load is placed on an airfoil, which is affixed to an attachment. The aero load is applied at a radial center of pressure (CP) for the airfoil or blade. A moment (M) generated at the point of attachment of the airfoil can be calculated as:

$$M = \text{Aero load} \times CP \quad \text{(Eq. 1)}.$$

An unseating moment (Mp) for the airfoil can be calculated as:

$$Mp = >1.5 \text{ Aero load} \times CP \quad \text{(Eq. 2)}.$$

As shown in the example of FIG. 12B, a ram force can react the moment (M) affecting the dovetail of the blade at the attachment point. The ram force relates to a force (F) being applied to the blade dovetail at a distance (d) with an angle alpha. For example, the force (F) relates to the ram force and the unseating moment (Mp) as follows:

$$F = \text{Ram Force}/2 \times \cos(\text{alpha}) \quad \text{(Eq. 3)};$$

and $$F \times d = Mp \quad \text{(Eq. 4)}.$$

A desired ram force can then also be related to the unseating moment (Mp):

$$\text{Ram Force}/2 \times \cos(\text{alpha}) \times d = Mp \quad \text{(Eq. 5); and}$$

$$\text{Ram Force} = 2[Mp/(2\cos(\text{alpha}) \times d)] \quad \text{(Eq. 6)}.$$

As such, a ram force can be calculated to react an unseating moment for a blade dovetail and used to apply a ram and/or other preload to the dovetail, as described herein.

Returning to the example counterweight collet 700 of FIG. 7, certain examples provide a dovetail interface to a collet design. That is, alternatively or in addition to providing a preload force to a blade dovetail in a slot/socket/trunnion, a collet can be employed to retain the dovetail in the slot/socket/trunnion. Certain examples apply this configuration to an open rotor turbofan engine in which a pitch-controlled blade requires that blade attachment be maintained. Using a dovetail interface, the modified collet provides axial retention in both forward and aft directions and adds stiffness to collet posts. Since the collet 700 is circular, stiffness in the posts counters less stiffness at the dovetail slot breakout ends compared to at mid-span of the collet 700. Certain examples enable use of a dovetail slot in a collet design. A dovetail slot allows for flight-line removal of blades and also allows the blade to be much thinner at the root, which limits the blade hub flow blockage, for example. Additionally, certain examples with dovetail use enable a pitch change configuration, allowing a thinner blade shank near the hub, adjustment of the blade, etc.

The initial collet 700 and dovetail configuration of FIG. 7 can be modified for better retention of the dovetail in the slot. FIGS. 13A-13C illustrate an improved collet dovetail configuration 1300 in which a blade dovetail slot is provided in a collet and/or trunnion with combined axial retention and slot stiffeners (also referred to herein as retainers or retention straps) on both sides of the slot. The example of FIGS. 13A-13C applies to a variable pitch collet with a dovetail slot, for example, and/or other collet configuration on a rotatable hub (e.g., an open rotor engine hub, etc.) and provides axial retention for a blade in the slot. Post stiffening can be provided via a bolted connection. Certain examples incorporate optional machined ramped interfaces for additional stiffening and/or optional axial bolting to retain collet interfaces.

For example, a round collet can be machined to flatten forward and aft faces and form pockets with ramps to hold one or more stiffening straps in position and react moments to keep the blade in place. In certain examples, the collet can be formed of titanium or other similar material, with components formed of the same material or at least material matching a coefficient of thermal expansion (CTE). Other parts of the trunnion or socket could be formed of titanium as well, rather than steel, because the improved collet reinforces and provides support, rendering the heavier metal in the trunnion unnecessary. As such, the improved configuration not only provides increased support for the blade but also reduces weight of the materials.

More specifically, FIG. 13A illustrates an example perspective view of a collet/trunnion base 1300 for a blade dovetail. The collet/trunnion socket 1300 includes a slot 1310 into which the dovetail of a blade is positioned. Retainers or stiffeners 1320, 1325 are provided at the ends of the slot 1310. The retainers 1320, 1325 combine axial retention and slot stiffening to help keep the blade seated in the slot 1310.

FIG. 13B shows a top view of the arrangement 1300 of FIG. 13A. As shown in the example of FIG. 13B, the blade slot 1310 in the collet/trunnion 1300 is bounded by the axial retainer 1320. As shown in the example top view of FIG. 13B, ramps 1330, 1335 can (optionally) be machined into the retainer 1320 for additional stiffening support. Ramps 1330, 1335 can be aligned with the dovetail as it fits in the slot 1310, for example. A pocket 1340, 1345 can be machined in the collet/trunnion 1300 and the retainer 1320 on each end of the retainer 1320. A bolt 1350, 1355 is (optionally) positioned through the respective end of the retainer 1320 through the pocket 1340, 1345 and into the collet/trunnion 1300 to secure the retainer 1300 with respect to the collet/trunnion 1300 and secure the dovetail in the slot 1310. While the retainer 1320 is shown as an example, the retainer 1325 (not shown in this view) can be similarly configured at the other end of the slot 1310 of the collet/trunnion 1300.

FIG. 13C shows an axial view of the arrangement 1300 of FIGS. 13A-13B. As shown in the example of FIG. 13C, pockets 1340, 1345 are machined into the collet/trunnion fixture 1300 to accommodate the retainers 1320, 1325 and machined ramps 1330, 1335 can be provided for additional stiffening.

As such, the example of FIGS. 13A-13C provides axial retention for a blade in the slot and provides post stiffening via a bolted connection. The example of FIGS. 13A-13C can incorporate machined ramp interfaces for additional stiffening. The example of FIGS. 13A-13C can incorporate axial bolting to retain collet interfaces. The example of FIGS. 13A-13C can apply to a variety of collet/trunnion configurations including a variable pitch collet with a dovetail slot, for example.

Certain examples provide a blade retention apparatus including a receiving means, such as the collet/trunnion 1300, including a slot to receive an end of a blade, and a retention means, such as the retainers 1320, 1325, taken alone or in conjunction with the ramps 1330, 1335 and/or the pockets 1340, 1345, positioned at a first end and a second end of the receiving means to provide axial retention for the blade in the slot.

FIGS. 14A-14D show alternative example views of a collet and dovetail design, in which the dovetail surrounds and/or is otherwise attached to the collet, rather than being positioned in a slot. The example of FIG. 14A shows an alternative collet 1400 design including a blade dovetail 1405 positioned around the collet 1400 and surrounds the slot 1410 of the collet 1400. In the example of FIG. 14A, a radial force 1415 is added, impacting the blade dovetail 1405 to keep the dovetail 1405 seated in the collet 1400. As shown in the example of FIG. 14B, a bolt 1420 can connect or affix the blade and/or its dovetail 1405 to the collet 1400 in single shear. Placement of the bolt 1420 reduces a likelihood that the dovetail 1405 can be forced apart or pried open. However, the bolt 1420 can be removed to service or replace the blade and/or the collet 1400 (e.g., while on-wing).

FIG. 14C illustrates an example configuration in which the dovetail is positioned in a clamped, split arrangement with respect to the collet 1400. The dovetail has a primary portion 1430 which interacts with the collet 1400 and a split portion 1435 that works with the primary portion 1430 to engage and clamp the collet 1400. The bolt 1420 connects the primary portion 1430 and the split portion 1435 around the collet 1400. As shown in the example of FIG. 14D, a variation of the clamped split dovetail can include a shim or taper 1440 engaging with a clamping dovetail 1450 that is bolted to the shimmed/tapered collet 1440 with the bolt 1420. The example configuration of FIG. 14D provides a double shear connection with the bolt 1420, for example.

Thus, using one or more of the example configurations of FIGS. 14A-14C, dovetail faces can be angled (e.g., 60-90 degrees), parallel, etc., and positioned with respect to a collet to react vibratory forces, for example. One or more bolts can be used to attach the dovetail to the collet and carry friction and shear (single or double shear). If a blade is to be repaired or replaced, the dovetail can be unbolted from the collet to remove the blade, for example.

Example Changes in Pitch Axis

Blades are positioned in their sockets or slots at a certain angle or pitch. Pitch refers to an angle of the blade in air, for example. Pitch corresponds to a blade's angle of incidence, which affects the blade's angle of attack when in motion. In many configurations, an axis by which the pitch is measured (a radial pitch axis) aligns with a radial center of the engine (e.g., referred to as a radial pitch axis). However, in certain examples, instead of or in addition to locking/securing the blade in the collet, a change in pitch axis can also be used to react moments on the blade in the slot. A non-radial pitch axis can be used to mitigate moment reaction, for example. Certain examples provide a pitch change device for an aircraft engine, such as an open-rotor propeller driven engine or other bladed engine.

Figure 15A:
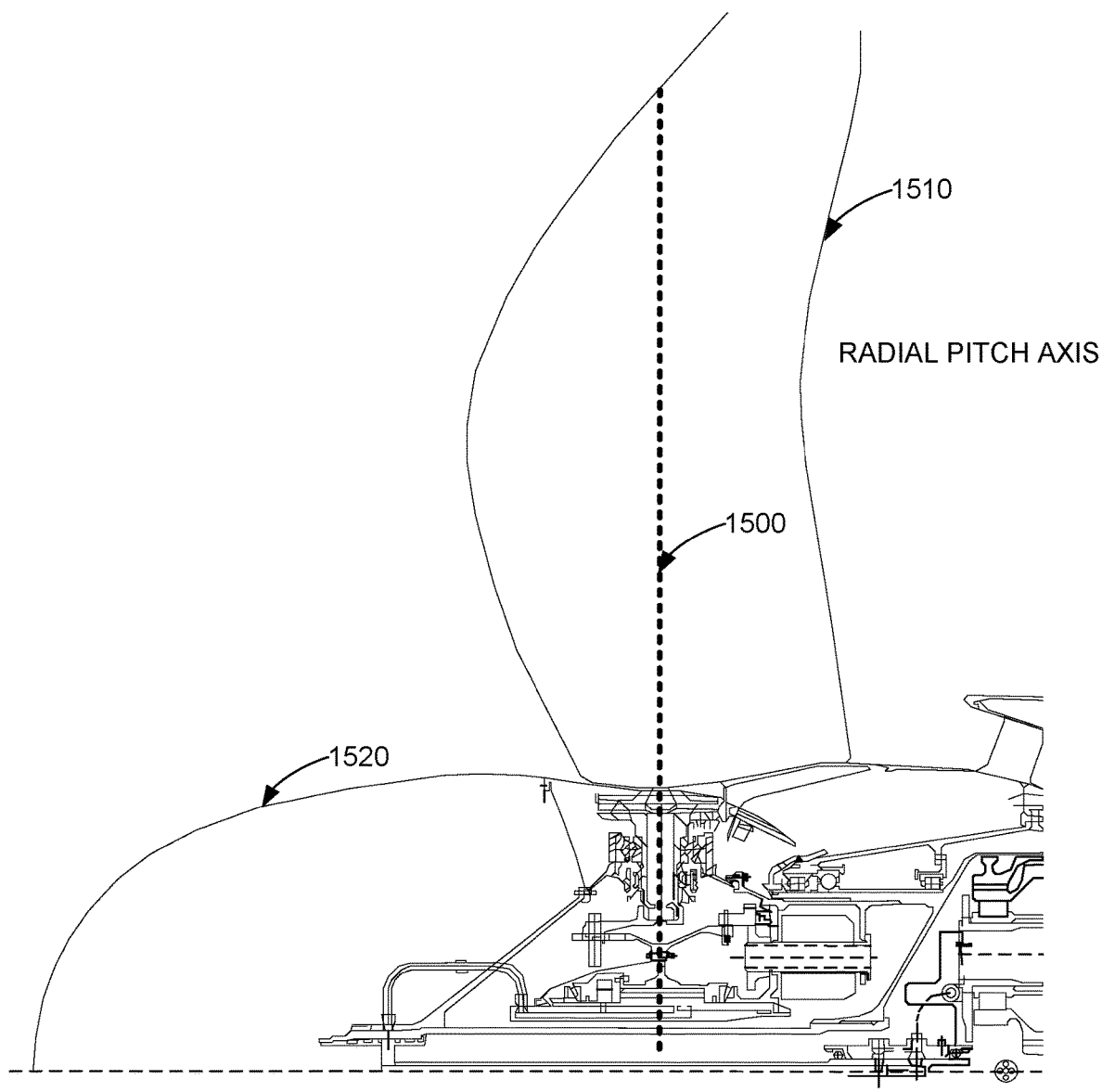
FIGS. 15A-15B show a conventional arrangement with a radial pitch axis around which a blade rotates that is oriented parallel or colinear to a radial center line of the engine.
Figure 15B:
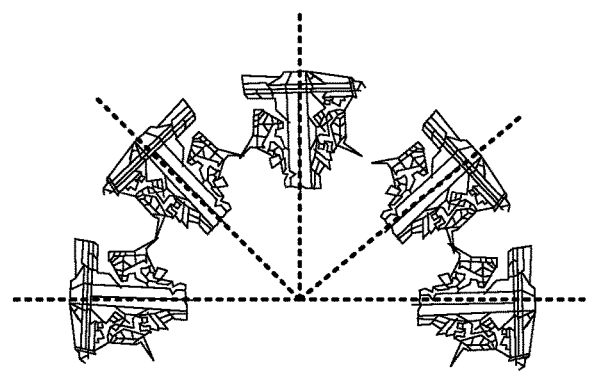

FIG. 15A shows a conventional arrangement with a radial pitch axis 1500 around which the blade 1510 rotates that is oriented parallel or colinear to a radial center line of the engine 1520. As shown in FIG. 15B, the blade 1510 in motion retains a pitch axis 1500 consistent with the radial center line of the engine.

Figure 16A:
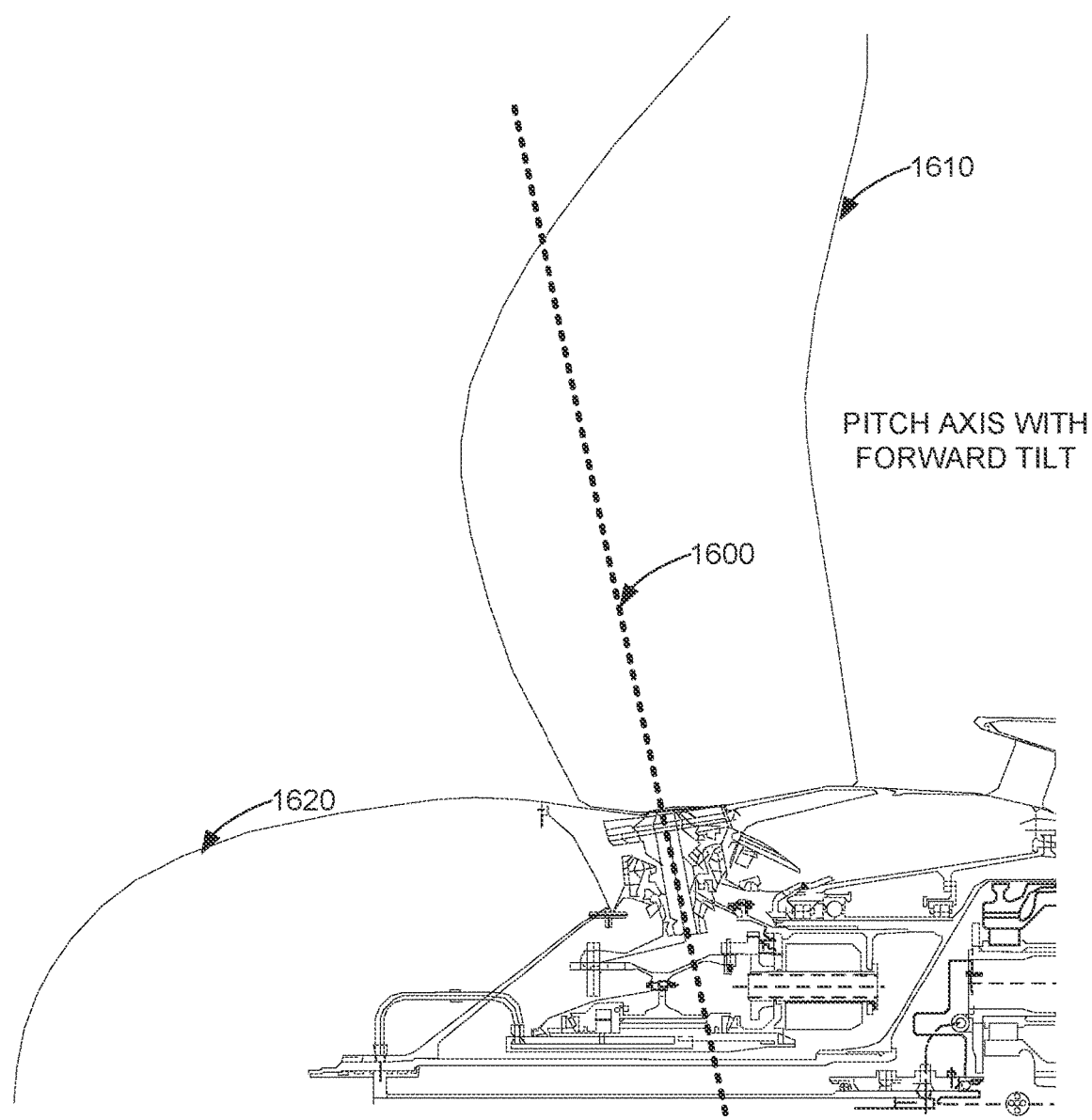
FIGS. 16A-16B show an example configuration in which the pitch axis is not parallel or colinear to the radial center line of the engine.
Figure 16B:
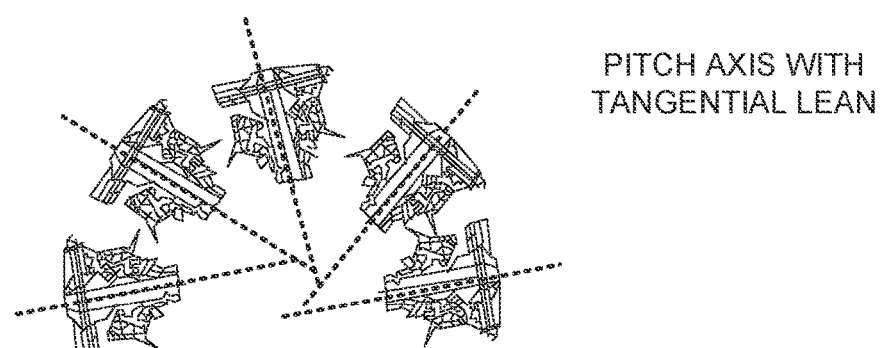

However, FIG. 16A illustrates an example configuration in which the pitch axis 1600 has a forward tilt and/or a tangential lean such that the pitch axis 1600 is not parallel or colinear to the radial center line of the engine 1620. As shown in the example of FIG. 16B, adding a tilt and/or lean (e.g., a tangential lean, etc.) to the pitch axis 1600 changes the inertial component of loading at off-design conditions due to pitch change. Such configuration can be used to reduce peak values of a moment reacted at the dovetail or root attachment and associated bearing(s), making values smaller and lighter, for example.

In certain examples, the pitch axis 1600 is tilted fore or aft, and/or leaned into or away from a direction of rotation. In response, the inertial component of a moment reaction at off-design conditions can be changed, allowing a reduction of the peak load (e.g., a 30% reduction for a lean/tilt combination of 5.6/1.6 degrees, etc.). A change in pitch axis angle 1600 by moving the blade 1600 relative to a line of action of force generates an artificial inertial reaction at a root or base of the blade 1610, and that reaction can be used to offset some of the load affecting the blade 1610, for example.

In certain examples, a hub provides a load-bearing attachment point for a plurality of blades. The hub rotates with a plurality of blades attached in an open- or closed-rotor engine design, for example. The hub can include one or more bearings, separately connected to or integrated with one or more trunnions (e.g., trunnion bearings if integrated). Each trunnion is associated with a blade and carries the radial load of the blade in connection with the hub. In certain examples, the hub can be machined such that the axis of the bearings is tilted or leaned relative to the engine center line to cause a change in the pitch axis. Rotation of the blades about an inclined axis reduce the peak bending moment and associated load on the blade.

For example, reverse thrust results in a greatly increased range of moment reaction involved at a blade attachment point. These moments are reacted by both the connection between the airfoil (e.g., blade) and the trunnion (e.g., a dovetail, etc.) and by the bearings between the trunnion and the hub. The size and weight of the dovetail attachment and the bearing arrangement are proportional to the maximum load, which also determines a radius ratio of the fan, which is a key performance metric. Certain examples reduce size and weight of the blade attachment and allow for improved stability and performance.

FIGS. 17-27 illustrate example configurations of a blade 1710 at an adjusted pitch angle with respect to a trunnion 1720 and its hub with bearing(s) 1730. As shown in the examples of FIGS. 17-27, a position at which the blade 1710 is mounted to hub 1730 of the trunnion 1720 sets a pitch angle of the blade 1710 and affects its load (e.g., radial load, etc.). The examples of FIGS. 17-27 illustrate that a variety of placements of the blade 1710 with respect to the trunnion 1720 are envisioned to create an adjusted pitch axis that aligns or diverges from a radial center line of the engine to create a desired moment reaction. By tilting, leaning, and/or otherwise shifting the blade 1710 with respect to the hub 1730 and/or the trunnion 1720, an artificial inertial reaction can be generated at the root of the blade 1710 to offset radial load.

Figure 17:
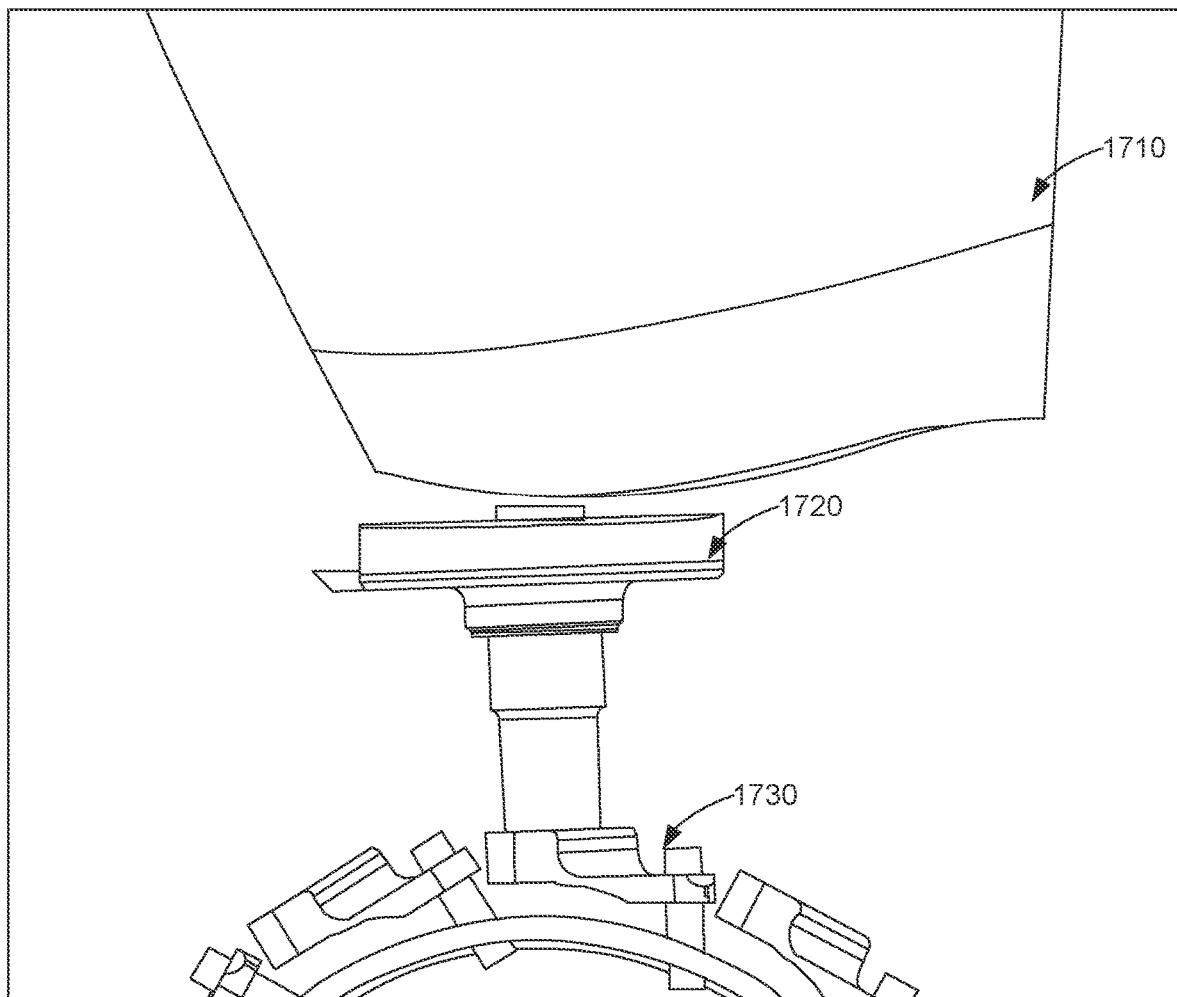
FIGS. 17-27 illustrate example configurations of a blade at an adjusted pitch axis.
Figure 18:
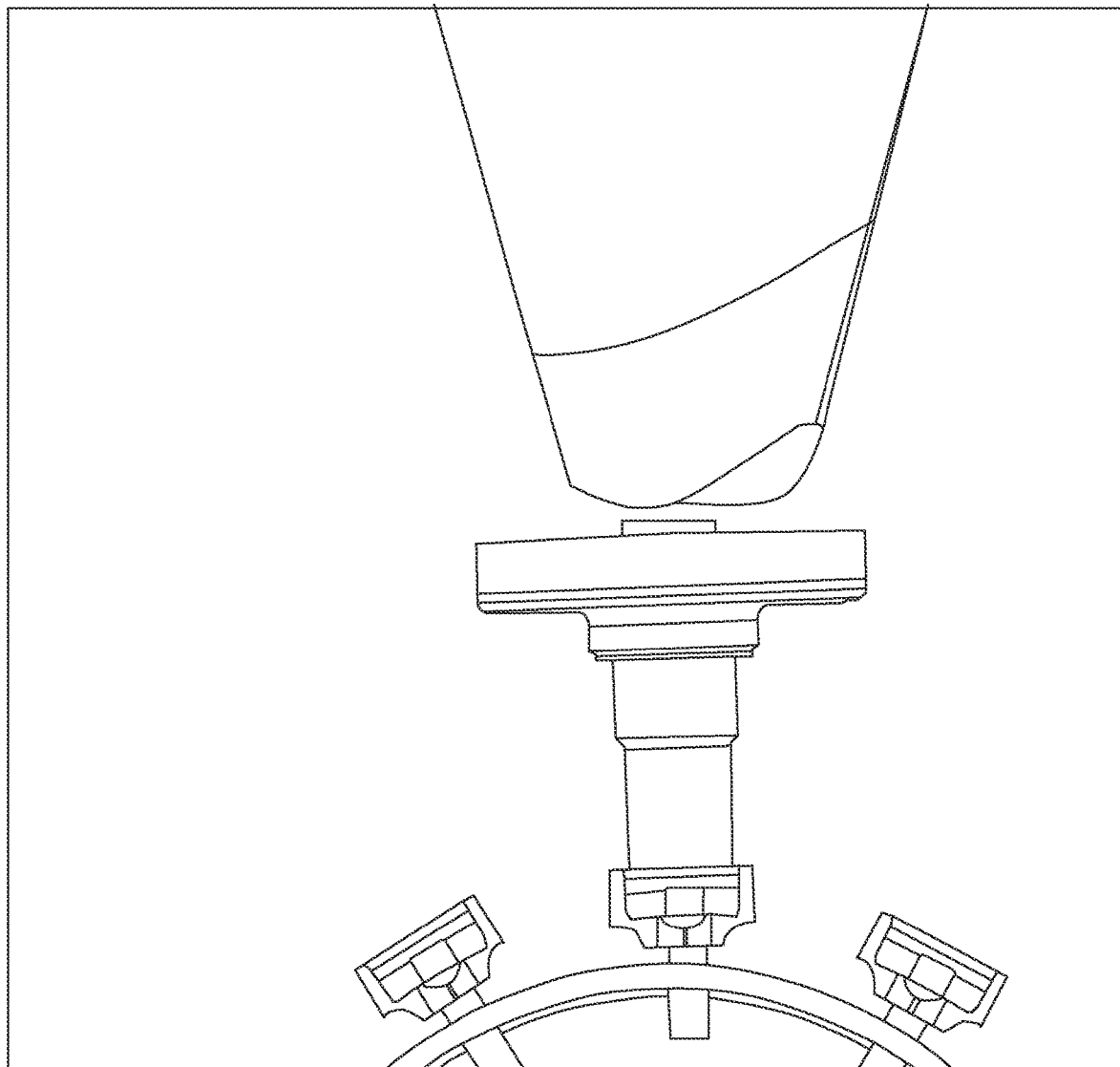
Figure 19:
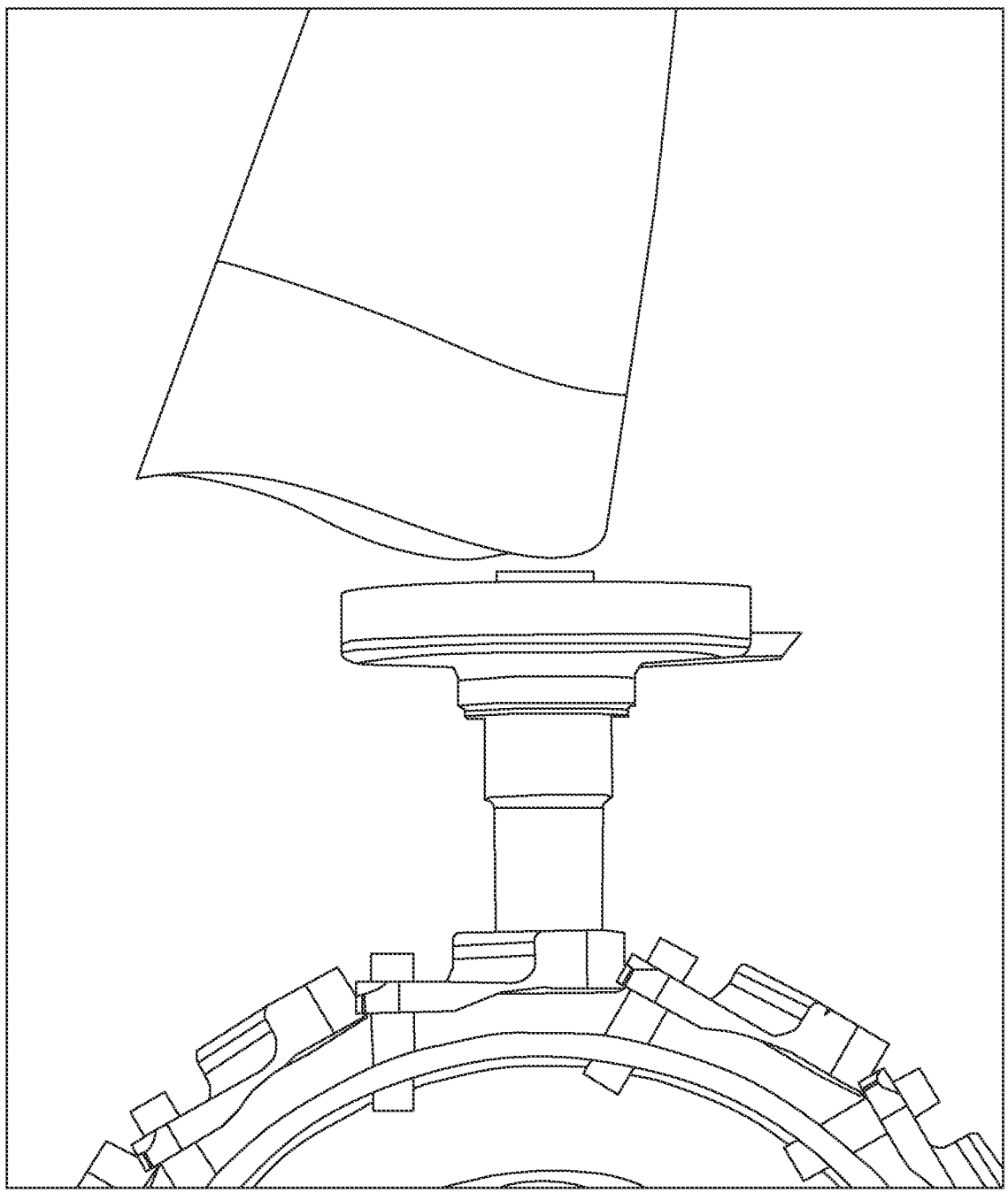
Figure 20:
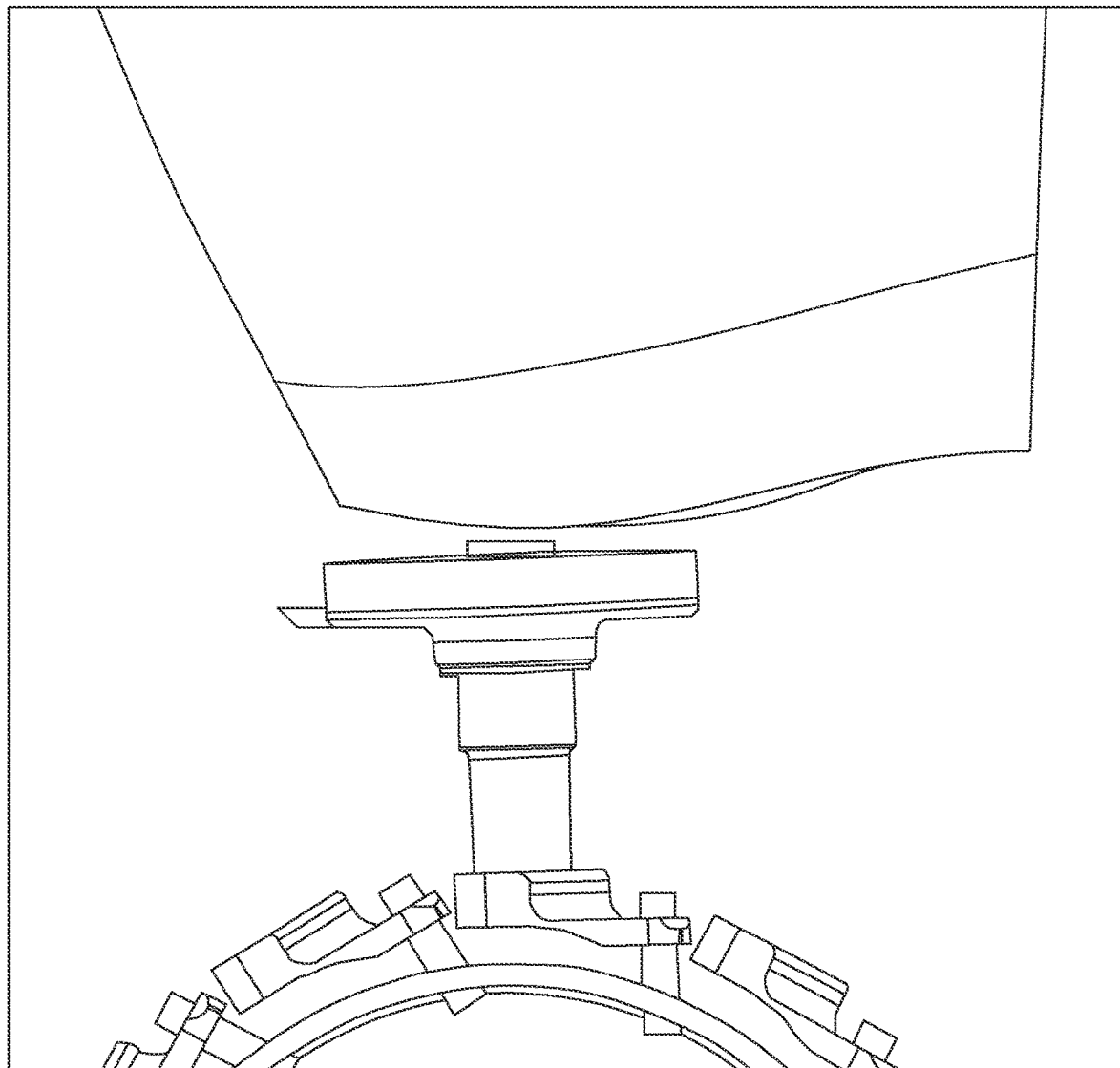
Figure 21:
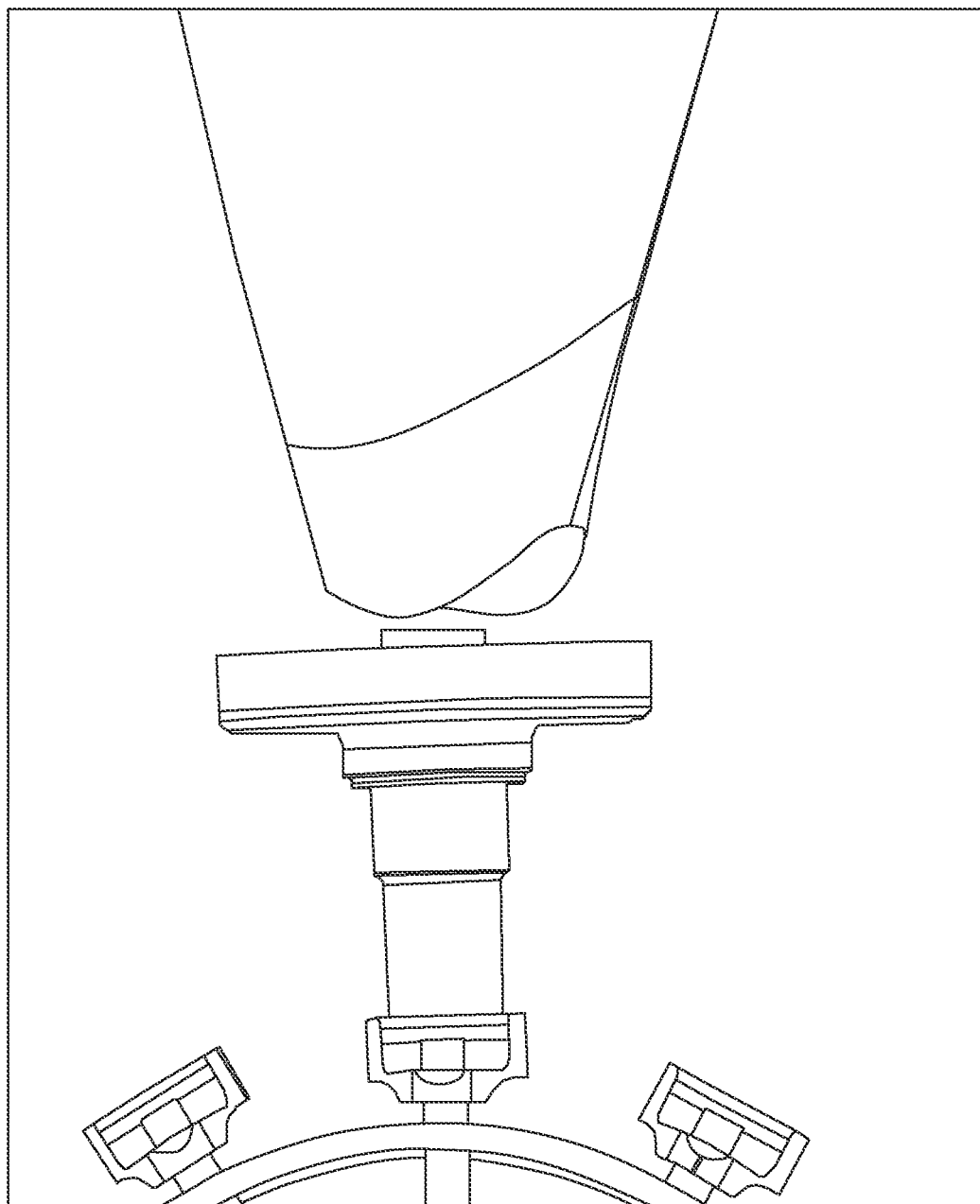
Figure 22:
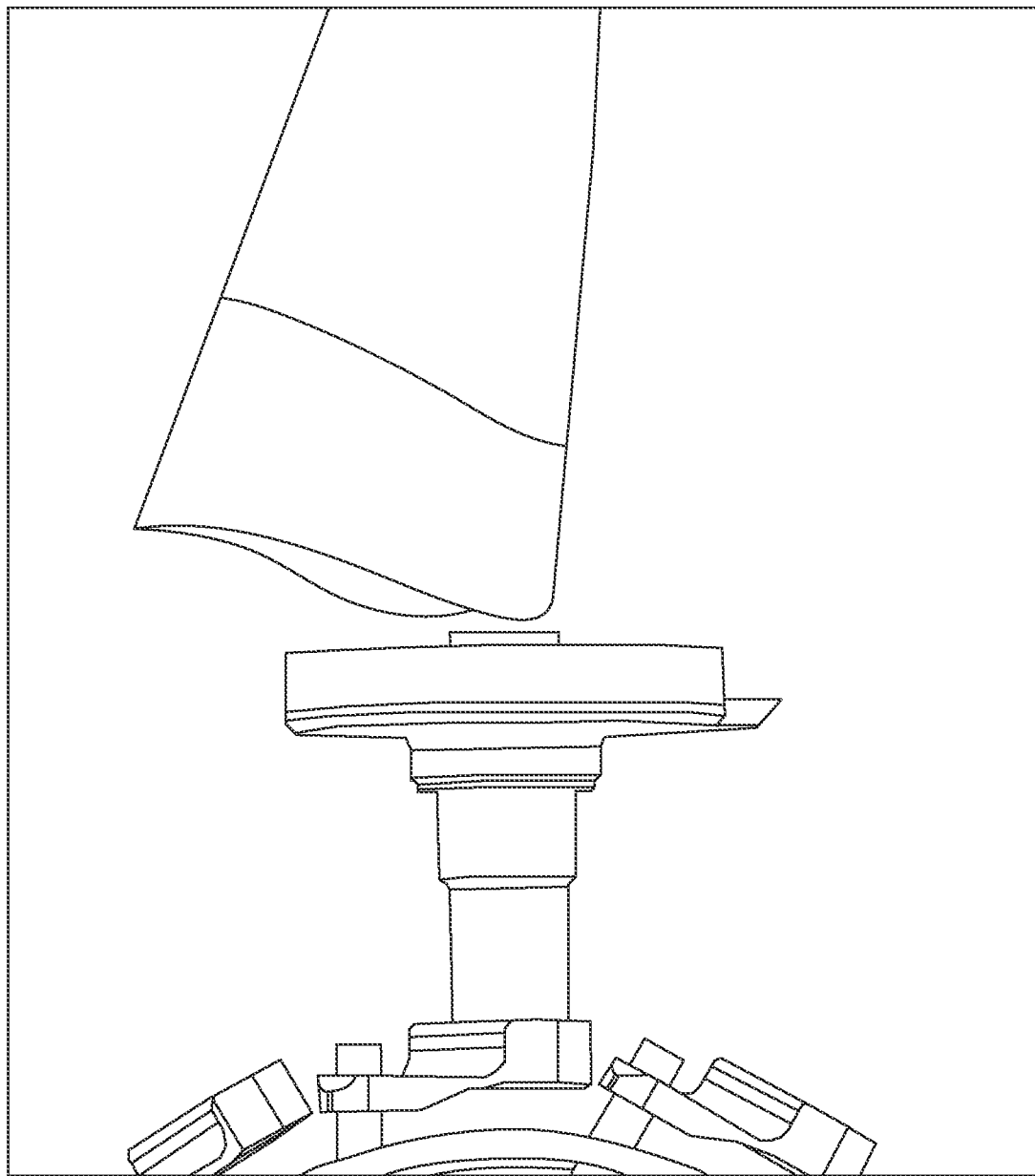
Figure 23:
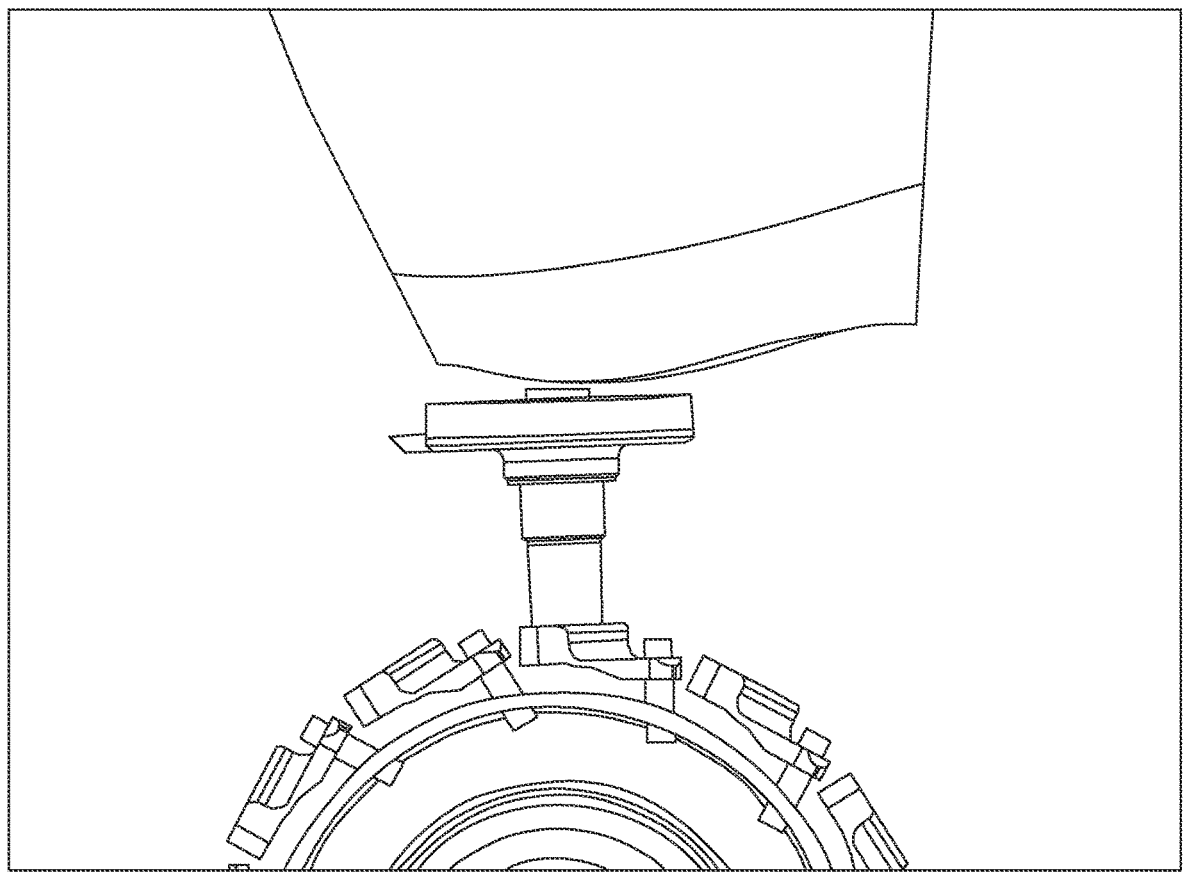
Figure 24:
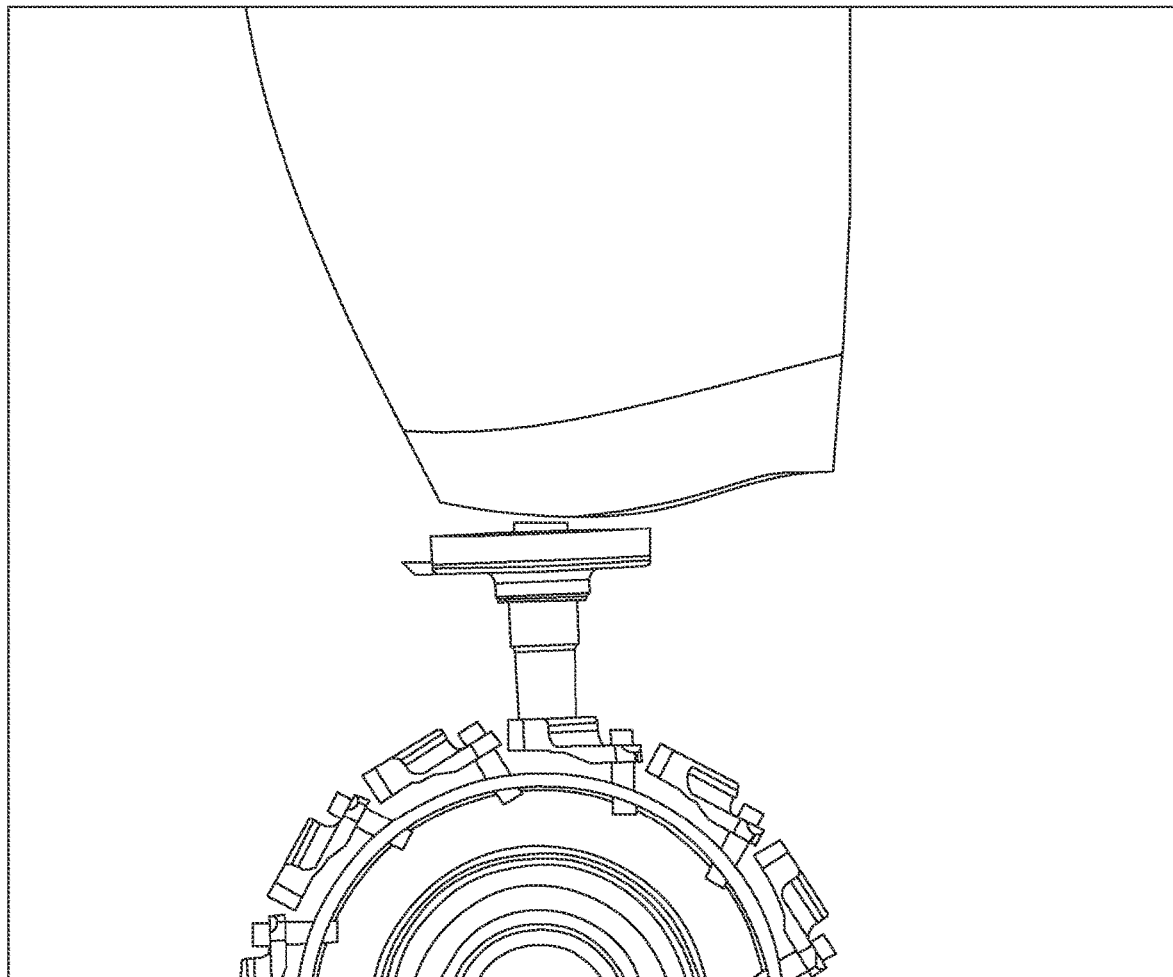
Figure 25:
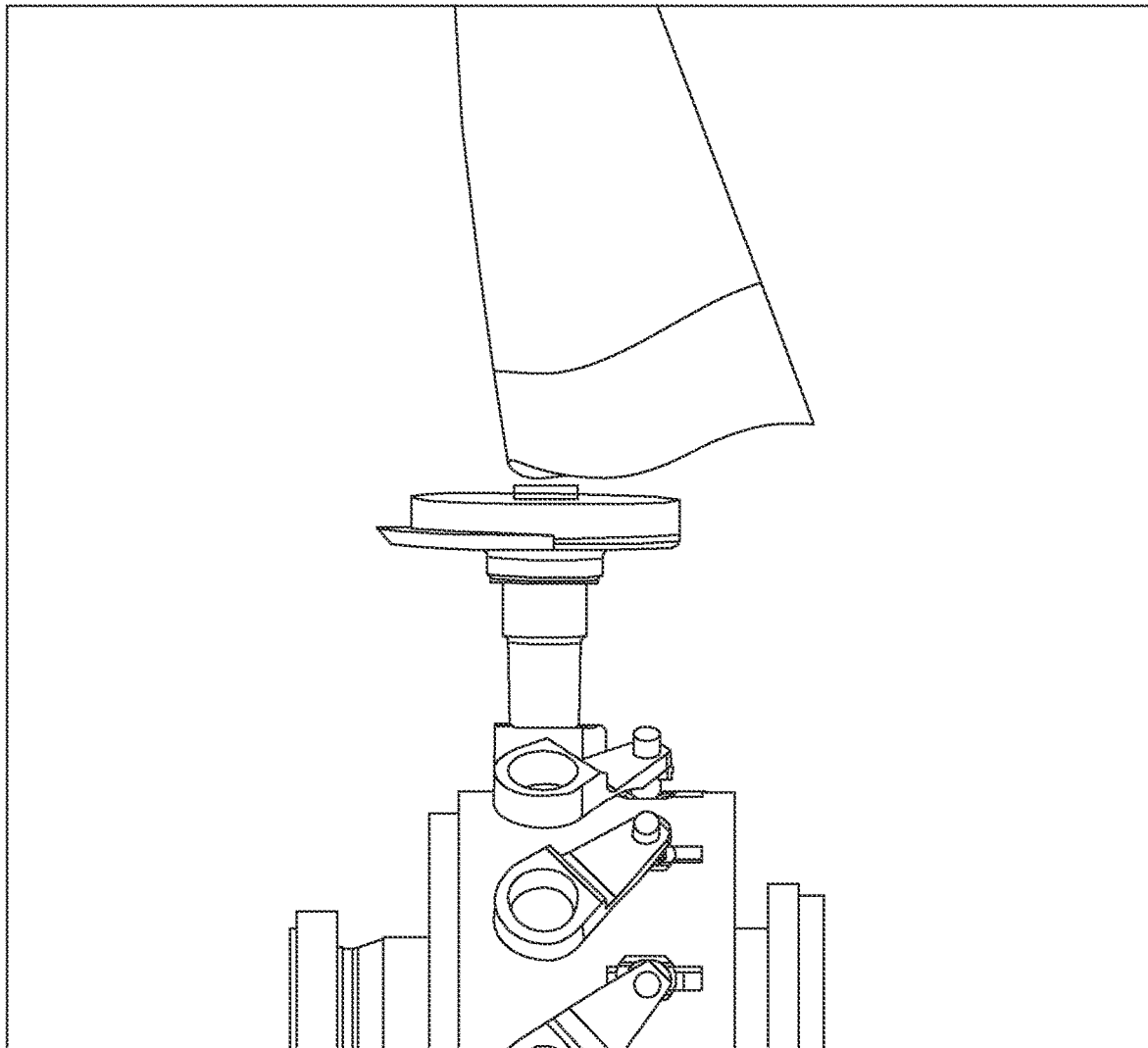
Figure 26:
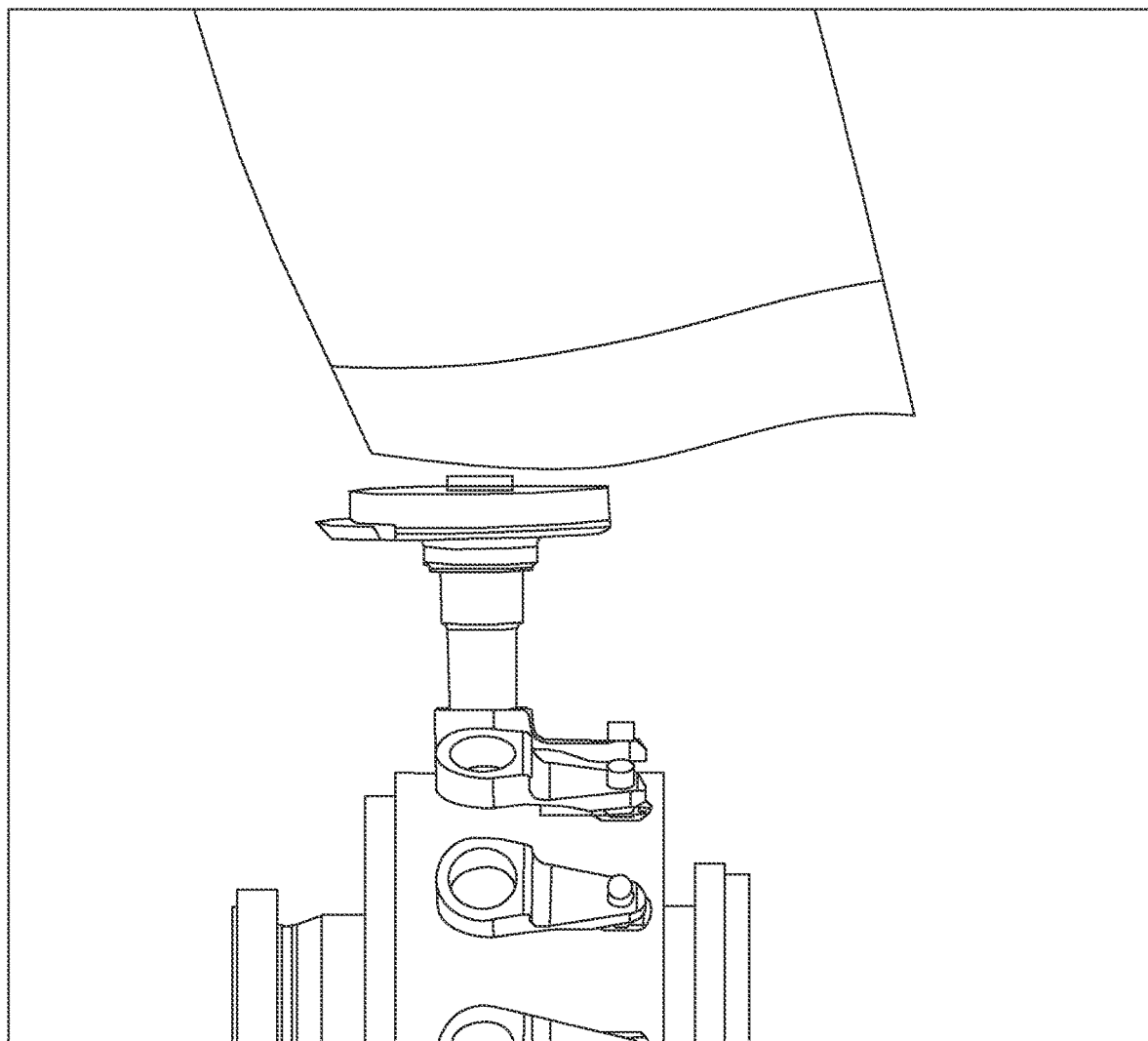
Figure 27:
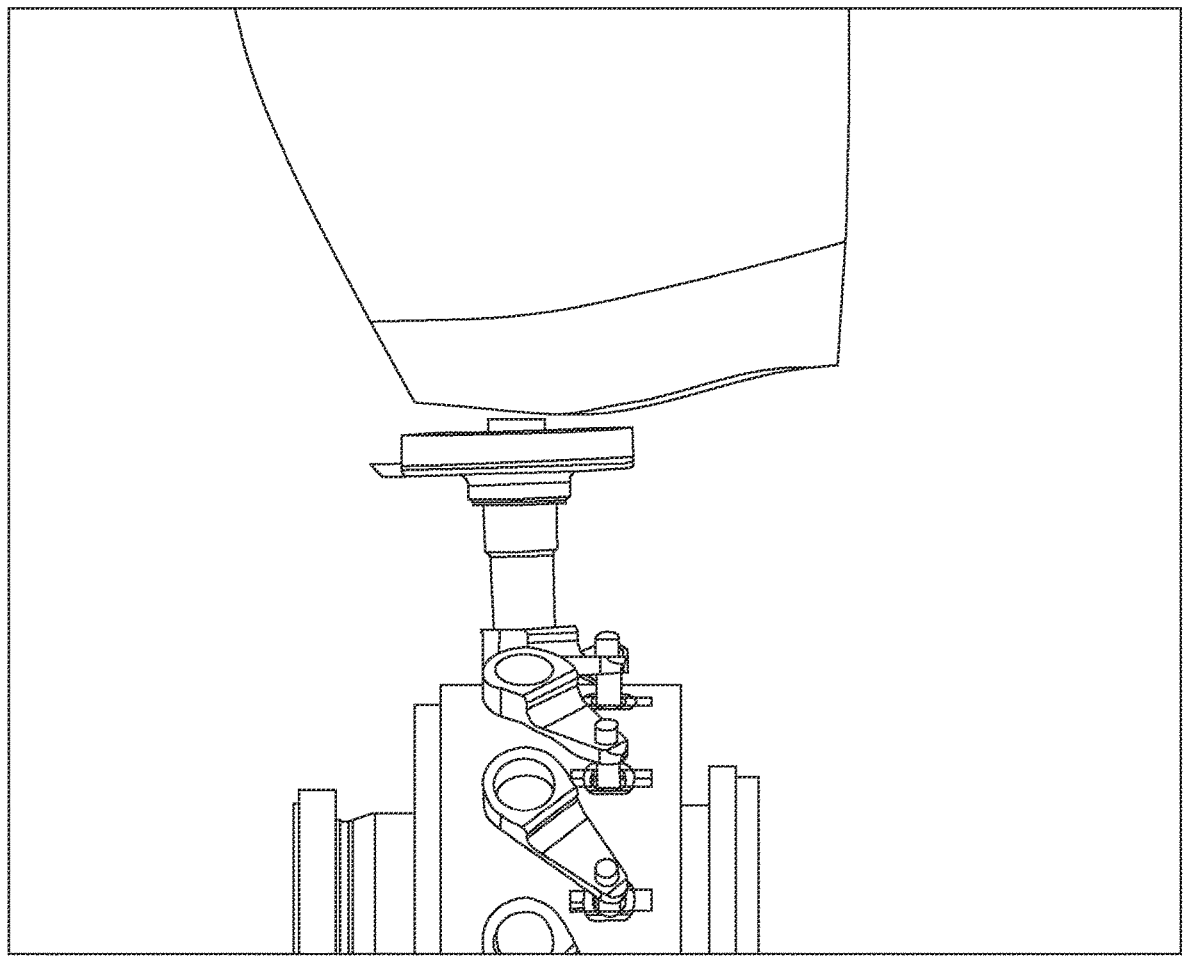

For example, FIG. 17 positions a first end of the blade 1710 near the connection to the trunnion 1720. In the example of FIG. 18, the blade 1710 is rotated with respect to the trunnion 1720. In FIG. 19, the first end of the blade 1710 is removably affixed to the trunnion 1720. FIGS. 20-27 provide additional examples of tiling, rotating, shifting, and/or otherwise moving the blade 1710 in the trunnion 1720 to generate a pitch axis that is offset from a radial axis of the hub 1730 and associated engine.

In certain examples, positioning of the blade 1710 with respect to the trunnion 1720 and/or the hub 1730 can be determined through finite element (FE) modeling to simulate and resolve reactions based on point of attachment between the blade 1710 and the trunnion 1720. The point of attachment and/or the associated pitch axis can be modified to determine a blade 1710 orientation and attachment point to the trunnion 1720 that reduces or minimizes reaction on the blade 1710, for example.

As such, certain examples provide a rotor apparatus including movement means, such as a hub, to facilitate movement of blades in an engine, the engine having a radial center line, and connection means, such as a trunnion, to accommodate a first blade, at least one of the connection means or the first blade positioned with at least one of a tilt or a lean with respect to the radial center line to form a pitch axis offset from the radial center line such that the pitch axis is not parallel to or co-linear with the radial center line, the movement means to rotate the first blade about the pitch axis. In certain examples, retention means includes at least one of a ram, a spring, a wedge, taper(s), screw(s), bolt(s), etc.

Figure 28:
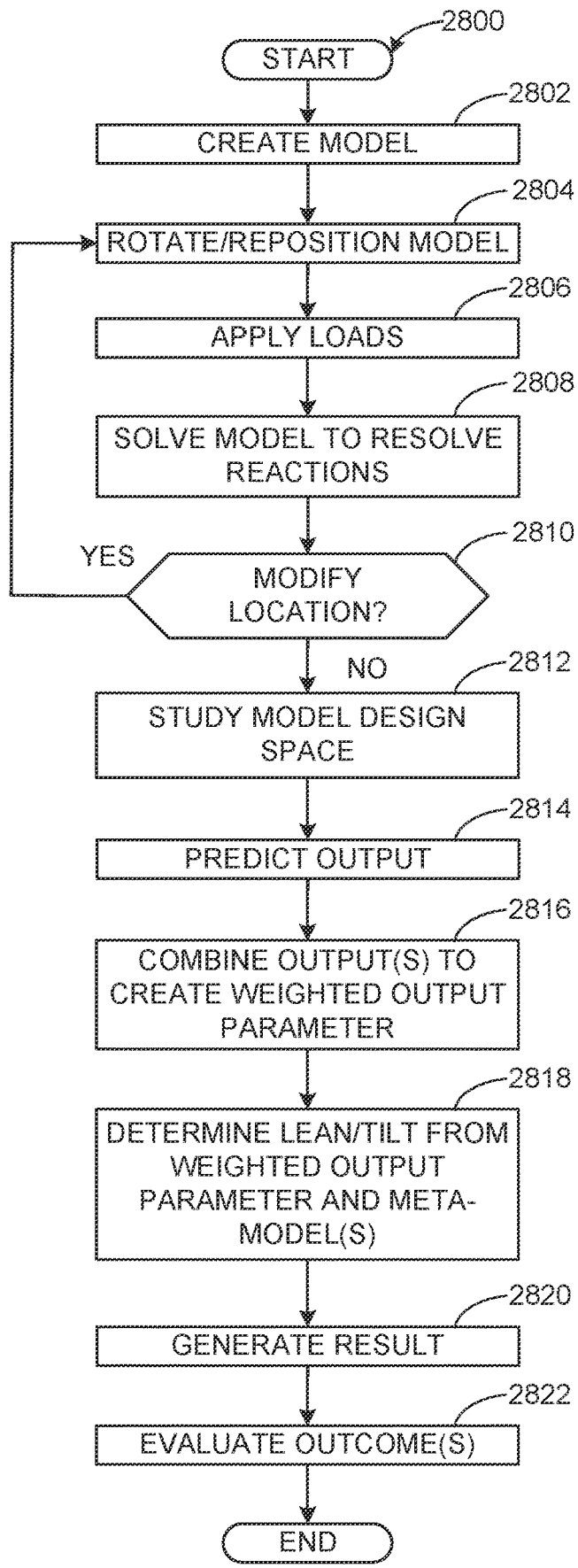
FIG. 28 is a flow chart of a method to determine blade position to set a pitch axis relative to an engine radial axis.

FIG. 28 is a flow chart of a method 2800 to determine blade position to set a pitch axis relative to an engine radial axis. In certain examples, at block 2802, a finite element (FE) model of the blade 1710 is created, and a dovetail attachment of the blade 1710 is connected to the trunnion 1720 and/or other attachment mechanism at a chosen location (e.g., centered about a pitch axis). At block 2804, the blade is rotated about the chosen location (e.g., pitch axis) to represent different operating conditions, and, at block 2806, corresponding pressure and temperature loads can be applied. At block 2808, the model can be solved and reactions resolved at the point of attachment, for example. Maximum and minimum values of critical reactions can be determined. At block 2810, a location of the dovetail and/or pitch axis can be modified and the analyses repeated to find a location with minimum absolute value of critical reaction (e.g., balance dovetail).

In certain examples, at block 2812, a Design of Experiments (DoE) study of design space is created in which the pitch axis is leaned and/or tilted over a narrow range (+/−10 deg). At block 2814, results can be tabulated, and a statistical analysis/data processing tool is used to create meta-models (e.g., surrogate models) predicting output based on lean/tilt. At block 2816, a weighted output parameter can be created by combining individual outputs using a relative importance function. At block 2818, an optimization tool can be used to run the meta-models and determine the combination of lean/tilt resulting in the minimum weighted output parameter.

In certain examples, at block 2820, results are weighted by combining two results to get one final result (e.g., one result is more valuable than the other so weight it, etc.). At block 2822, inputs can be examined to give the most attractive combined result, and various inputs can be weighted to determine what is most important/what provides the best outcome. For example, pitch/lean can be varied by 10% to evaluate an impact on force, moment, etc.

As described herein, a variety of devices, positioning, and associated techniques can be applied to maintain or retain a blade in a collet, trunnion, slot, and/or other socket. Certain examples provide a variety of blade retention apparatus that can be used separately or in combination to reduce a likelihood of movement of a dovetail in a socket (e.g., trunnion, collet, slot, etc.). Certain examples provide a locking spacer or insert. Certain examples provide a ram, wedge, spring, retention strip, and/or other device to apply radial and/or axial preload to the dovetail or base of a blade/airfoil. Certain examples adjust the pitch axis. Certain examples both adjust the pitch axis and provide a spacer to secure the blade in its slot.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that improve design and configuration of a blade in a slot. Certain examples improve positioning and maintenance of positioning of the blade in the slot when subjected to force.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Further aspects are provided by the subject matter of the following clauses:

Example 1 provides an apparatus including a socket to receive an end of a blade; and a retaining device to interact with the socket and the blade for retention of the end of the blade in the socket. The retaining device includes: a spacer to be positioned in the socket with the end of the blade; a wedge positioned inside the spacer; and a spring to tighten to pull the wedge to expand the spacer.

Example 2 is the apparatus of any preceding clause, wherein the socket includes a trunnion.

Example 3 is the apparatus of any preceding clause, wherein the socket is positioned on a hub of an open-rotor engine.

Example 4 is the apparatus of any preceding clause, wherein the spring is tightened to lock the wedge with respect to the spacer in the socket.

Example 5 is the apparatus of any preceding clause, wherein the spacer, the wedge, and the spring are metallic.

Example 6 is the apparatus of any preceding clause, wherein at least one of the spacer, the wedge, or the spring has a coating.

Example 7 is the apparatus of any preceding clause, wherein the spacer is formed in a curve.

Example 8 is the apparatus of any preceding clause, wherein the spacer is formed as a single bent piece.

Example 9 is the apparatus of any preceding clause, wherein the spacer is formed from a plurality of parts joined together.

Example 10 is the apparatus of any preceding clause, further including a ram positioned with respect to the end of the blade in the socket.

Example 11 is a retaining apparatus including: a spacer to be positioned in a socket with an end of a blade; a wedge positioned inside the spacer; and a spring to tighten to pull the wedge to expand the spacer.

Example 12 is the apparatus of any preceding clause, wherein the socket includes a trunnion.

Example 13 is the apparatus of any preceding clause, wherein the socket is positioned on a hub of an open-rotor engine.

Example 14 is the apparatus of any preceding clause, wherein the spring is tightened to lock the wedge with respect to the spacer in the socket.

Example 15 is the apparatus of any preceding clause, wherein at least one of the spacer, the wedge, or the spring has a coating.

Example 16 is the apparatus of any preceding clause, wherein the spacer is formed in a curve.

Example 17 is the apparatus of any preceding clause, wherein the spacer is formed as a single bent piece.

Example 18 is the apparatus of any preceding clause, wherein the spacer is formed from a plurality of parts joined together.

Example 19 is the apparatus of any preceding clause, further including a ram positioned with respect to the end of the blade in the socket.

Example 20 is a retaining system for a blade of an engine. The example retaining system includes: means for spacing to be positioned in a socket with an end of a blade; means for wedging positioned inside the means for spacing; and means for tightening to pull the means for wedging to expand the means for spacing.

Example 21 is a blade apparatus including a collet including a slot to receive an end of a blade; and a plurality of retainers including a first retainer positioned on a first end of the collet and a second retainer positioned on a second end of the collet to provide axial retention for the blade in the slot.

Example 22 is the apparatus of any preceding clause, wherein the plurality of retainers includes a plurality of straps.

Example 23 is the apparatus of any preceding clause, wherein the collet includes pockets to receive the retainers.

Example 24 is the apparatus of any preceding clause, wherein the collet includes ramps to retain and support the retainers.

Example 25 is the apparatus of any preceding clause, wherein the ramps align with the end of the blade that is positioned in the slot.

Example 26 is the apparatus of any preceding clause, wherein the collet is round with the first end and the second end flattened.

Example 27 is the apparatus of any preceding clause, wherein the plurality of retainers is secured to the collet using bolts.

Example 28 is the apparatus of any preceding clause, wherein at least one bolt extends into the blade.

Example 29 is the apparatus of any preceding clause, wherein the at least one bolt is in at least one of single shear or double shear.

Example 30 is the apparatus of any preceding clause, further including a ram positioned with respect to the end of the blade in the socket.

Example 31 is an open rotor engine apparatus including: a rotatable hub; a collet positioned on the hub, the collet including a slot to receive an end of a blade; and a plurality of retainers including a first retainer positioned on a first end of the collet and a second retainer positioned on a second end of the collet to provide axial retention for the blade in the slot.

Example 32 is the apparatus of any preceding clause, wherein the plurality of retainers includes a plurality of metal straps.

Example 33 is the apparatus of any preceding clause, wherein the collet includes pockets to receive the retainers.

Example 34 is the apparatus of any preceding clause, wherein the collet includes ramps to retain and support the retainers.

Example 35 is the apparatus of any preceding clause, wherein the collet is round with the first end and the second end flattened.

Example 36 is the apparatus of any preceding clause, wherein the plurality of retainers is secured to the collet using bolts.

Example 37 is the apparatus of any preceding clause, wherein at least one bolt extends into the blade.

Example 38 is the apparatus of any preceding clause, wherein the at least one bolt is in at least one of single shear or double shear.

Example 39 is the apparatus of any preceding clause, further including a ram positioned with respect to the end of the blade in the socket.

Example 40 is a blade retention apparatus including: a receiving means including a slot to receive an end of a blade; and a retention means positioned at a first end and a second end of the receiving means to provide axial retention for the blade in the slot.

Example 41 is a blade apparatus including: a hub to facilitate movement of blades in an engine, the engine having a radial center line; and a trunnion connected to the hub, the trunnion including a slot to accommodate a first blade, at least one of the trunnion or the first blade positioned with at least one of a tilt or a lean with respect to the radial center line to form a pitch axis offset from the radial center line such that the pitch axis is not parallel to or co-linear with the radial center line, the hub to rotate the first blade about the pitch axis.

Example 42 is the apparatus of any preceding clause, further including at least one bearing, the at least one bearing mounted to the hub and at least one of connected to or integrated with the trunnion.

Example 43 is the apparatus of any preceding clause, wherein the tilt includes a forward tilt.

Example 44 is the apparatus of any preceding clause, wherein the lean includes a tangential lean.

Example 45 is the apparatus of any preceding clause, wherein the tangential lean is into or away from a direction of rotation.

Example 46 is the apparatus of any preceding clause, wherein a position of the first blade is modeled to simulate and resolve reactions based on a point of attachment between the first blade and the trunnion.

Example 47 is the apparatus of any preceding clause, wherein at least one of the point of attachment or an orientation of the first blade are determined based on the simulated reactions on the first blade.

Example 48 is the apparatus of any preceding clause, further including a ram positioned with respect to the first blade in the trunnion.

Example 49 is the apparatus of any preceding clause, further including at least one of a spring or a wedge positioned with respect to the first blade in the trunnion.

Example 50 is a rotor apparatus including: movement means to facilitate movement of blades in an engine, the engine having a radial center line; and connection means to accommodate a first blade, at least one of the connection means or the first blade positioned with at least one of a tilt or a lean with respect to the radial center line to form a pitch axis offset from the radial center line such that the pitch axis is not parallel to or co-linear with the radial center line, the movement means to rotate the first blade about the pitch axis.

Example 51 is the apparatus of any preceding clause, wherein the tilt includes a forward tilt.

Example 52 is the apparatus of any preceding clause, wherein the lean includes a tangential lean.

Example 53 is the apparatus of any preceding clause, further including a retention means to retain the blade in the connection means.

Example 54 is a computer-implemented method to determine blade position to set a pitch axis relative to a radial engine axis. The example method includes: adjusting a position of a model of a blade at a location with respect to a trunnion attached to a hub of an engine; applying loads to the model; solving the model to resolve reactions caused by the loads; predicting one or more outputs based on the model solution; determining at least one of a lean or a tilt of the blade based on the one or more outputs; generating a blade position to form a pitch axis offset from a radial center line of the engine such that the pitch axis is not parallel to or co-linear with the radial center line, the blade to rotate about the pitch axis.

Example 55 is the method of any preceding clause, wherein the at least one output includes a plurality of outputs, and further including combining the outputs to create a weighted output parameter.

Example 56 is the method of any preceding clause, further including evaluating an outcome of the blade position.

Example 57 is the method of any preceding clause, wherein the model is a finite element model and wherein the position of the blade is modeled to simulate and resolve reactions based on a point of attachment between the blade and the trunnion.

Example 58 is the method of any preceding clause, wherein at least one of the point of attachment or an orientation of the blade are determined based on the reactions simulated and resolved on the blade.

Example 59 is the method of any preceding clause, wherein the location is a first location, and further including modifying the location to a second location and repeating the method.

Example 60 is the method of any preceding clause, further including creating a design space to at least one of lean or tilt the pitch axis within a range.

What is claimed is:

1. A blade apparatus comprising:
    a collet including a slot to receive an end of a blade; and
    a plurality of straps including a first strap positioned across and outside a first terminal end of the slot and a second strap positioned across and outside a second terminal end of the slot to provide axial retention for the blade in the slot, the collet including a first ramp and a second ramp positioned across the first terminal end to retain and support the first strap and including a third ramp and a fourth ramp positioned across the second terminal end to retain and support the second strap, the first ramp, the second ramp, and the first strap forming a first slot stiffener and the third ramp, the fourth ramp, and the second strap forming a second slot stiffener.

2. The blade apparatus of claim 1, wherein the collet includes pockets to receive the straps.

3. The blade apparatus of claim 1, wherein the ramps align with the end of the blade that is positioned in the slot.

4. The blade apparatus of claim 1, wherein the collet is round with the first end and the second end flattened.

5. The blade apparatus of claim 1, wherein the plurality of straps is secured to the collet using bolts.

6. The blade apparatus of claim 5, wherein at least one bolt extends into the collet.

7. The blade apparatus of claim 6, wherein the at least one bolt is in at least one of single shear or double shear.

8. The blade apparatus of claim 1, further including a ram positioned with respect to the end of the blade in the slot.

9. An open rotor engine apparatus comprising:
a rotatable hub;
a collet positioned on the rotatable hub, the collet including a slot to receive an end of a blade; and
a plurality of straps including a first strap positioned across and outside a first terminal end of the slot and a second strap positioned across and outside a second terminal end of the slot to provide axial retention for the blade in the slot, the collet including a first ramp and a second ramp positioned across the first terminal end to retain and support the first strap and including a third ramp and a fourth ramp positioned across the second terminal end to retain and support the second strap, the first ramp, the second ramp, and the first strap forming a first slot stiffener and the third ramp, the fourth ramp, and the second strap forming a second slot stiffener.

10. The open rotor engine apparatus of claim 9, wherein the collet includes pockets to receive the straps.

11. The open rotor engine apparatus of claim 9, wherein the collet is round with the first end and the second end flattened.

12. The open rotor engine apparatus of claim 9, wherein the plurality of straps is secured to the collet using bolts.

13. The open rotor engine apparatus of claim 12, wherein at least one bolt extends into the collet.

14. The open rotor engine apparatus of claim 13, wherein the at least one bolt is in at least one of single shear or double shear.

15. The open rotor engine apparatus of claim 9, further including a ram positioned with respect to the end of the blade in the slot.

\* \* \* \* \*